(12) United States Patent
Sahara et al.

(10) Patent No.: US 11,901,768 B2
(45) Date of Patent: Feb. 13, 2024

(54) BRUSHLESS MOTOR

(71) Applicant: DENSO CORPORATION, Kariya (JP)

(72) Inventors: Yoshimichi Sahara, Kariya (JP); Akio Murase, Kariya (JP)

(73) Assignee: DENSO CORPORATION, Kariya (JP)

( * ) Notice: Subject to any disclaimer, the term of this patent is extended or adjusted under 35 U.S.C. 154(b) by 444 days.

(21) Appl. No.: 17/414,287

(22) PCT Filed: Jun. 23, 2020

(86) PCT No.: PCT/JP2020/024672
§ 371 (c)(1),
(2) Date: Jun. 15, 2021

(87) PCT Pub. No.: WO2021/049128
PCT Pub. Date: Mar. 18, 2021

(65) Prior Publication Data
US 2022/0069643 A1    Mar. 3, 2022

(30) Foreign Application Priority Data

Sep. 13, 2019 (JP) ................................ 2019-167233

(51) Int. Cl.
*H02K 1/16* (2006.01)
*H02K 3/12* (2006.01)
*H02K 3/28* (2006.01)
*H02K 3/48* (2006.01)

(52) U.S. Cl.
CPC ............... *H02K 1/165* (2013.01); *H02K 3/12* (2013.01); *H02K 3/28* (2013.01); *H02K 3/48* (2013.01)

(58) Field of Classification Search
CPC .......... H02K 1/165; H02K 3/28; H02K 11/33; H02K 3/12; H02K 21/222; H02K 3/48; H02K 1/187
USPC ........................................................ 310/179
See application file for complete search history.

(56) References Cited

U.S. PATENT DOCUMENTS

| | | | | | |
|---|---|---|---|---|---|
| 6,127,760 | A | * | 10/2000 | Nagasaki | ............... H02K 3/522 310/216.049 |
| 7,254,881 | B2 | * | 8/2007 | Egawa | .................... H02K 23/04 29/598 |
| 7,569,969 | B2 | * | 8/2009 | Nakano | ..................... H02K 1/30 310/264 |
| 8,080,916 | B2 | * | 12/2011 | Shioda | .................... H02K 23/38 310/198 |
| 8,274,193 | B2 | * | 9/2012 | Kawashima | ........... H02K 23/36 310/233 |

(Continued)

FOREIGN PATENT DOCUMENTS

| | | |
|---|---|---|
| JP | 2010-273450 A | 12/2010 |
| JP | 6291292 B2 | 3/2018 |

OTHER PUBLICATIONS

Sep. 24, 2020 International Search Report issued in International Patent Application No. PCT/JP2020/024672.

*Primary Examiner* — Alex W Mok
(74) *Attorney, Agent, or Firm* — Oliff PLC

(57) ABSTRACT

Plural windings are wound around plural teeth in sequence such that crossover wires formed in the plural windings are all arranged on another axial direction side of an annular section of a stator core. When this is performed, the plural windings are wound around the plural teeth in sequence such that terminal portions of the plural windings are placed in a fifth slot, a sixth slot, an eighth slot, and a ninth slot.

2 Claims, 34 Drawing Sheets

(56) References Cited

U.S. PATENT DOCUMENTS

| | | | |
|---|---|---|---|
| 9,608,486 B2 * | 3/2017 | Sahara | H02K 3/28 |
| 9,866,084 B2 * | 1/2018 | Hashimoto | H02K 3/38 |
| 10,044,250 B2 * | 8/2018 | Seki | H02K 3/28 |
| 10,128,718 B2 * | 11/2018 | Murase | H02K 3/522 |
| 2010/0295394 A1 | 11/2010 | Sahara et al. | |
| 2013/0200742 A1 * | 8/2013 | Seki | H02K 15/095 |
| | | | 310/195 |
| 2014/0339936 A1 | 11/2014 | Sahara et al. | |
| 2019/0013710 A1 * | 1/2019 | Kawasaki | H02K 1/148 |

* cited by examiner

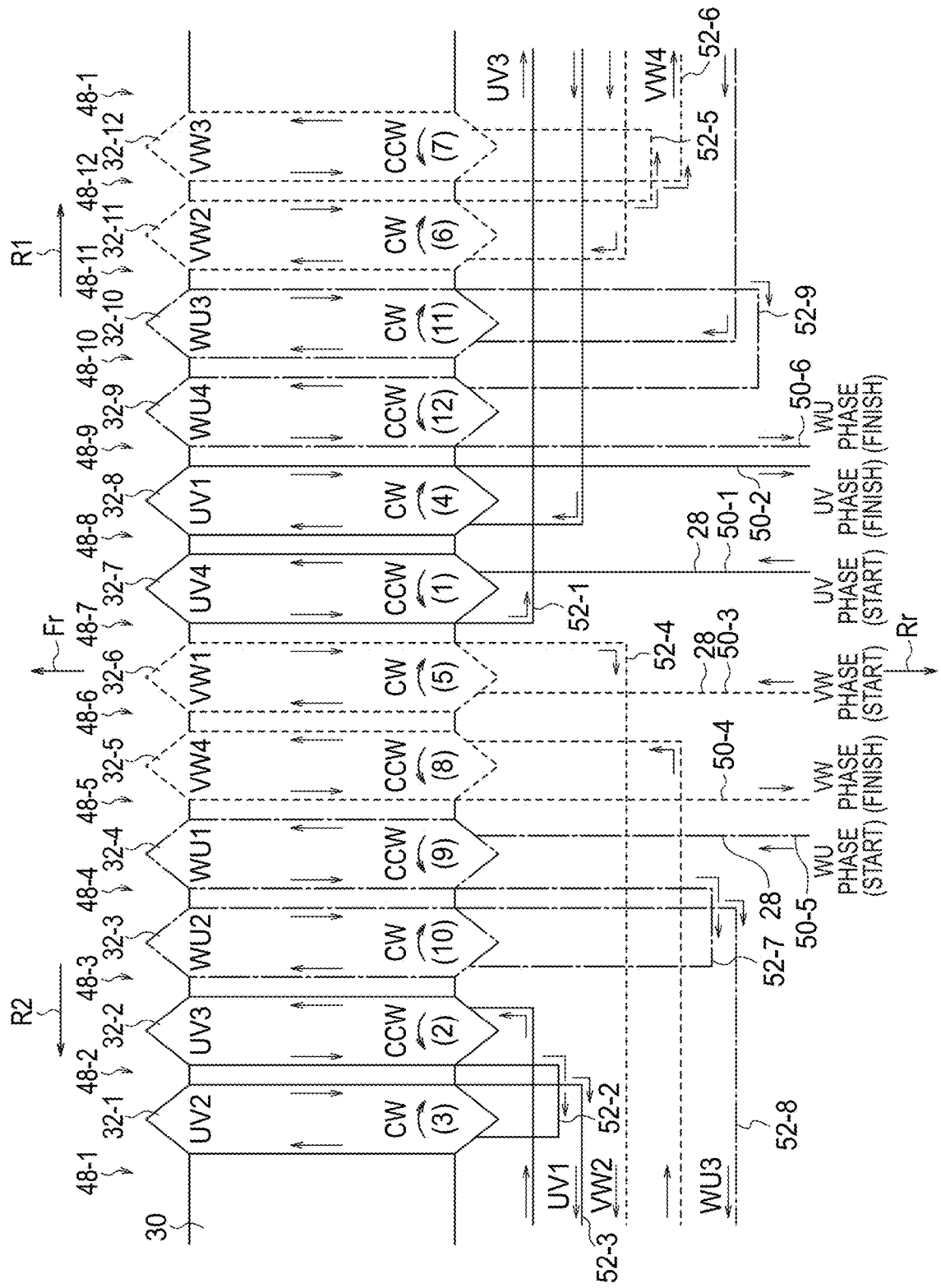

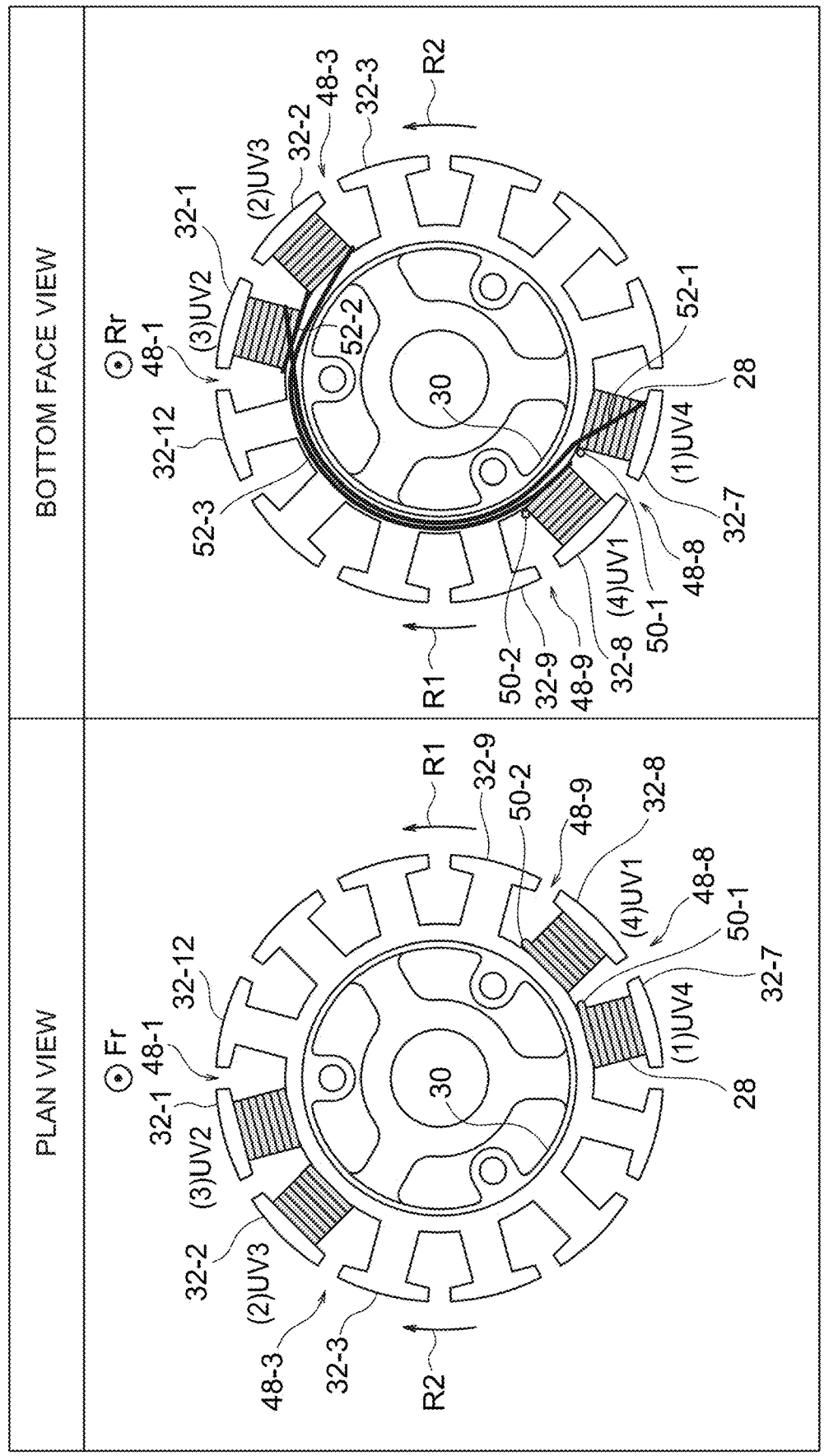

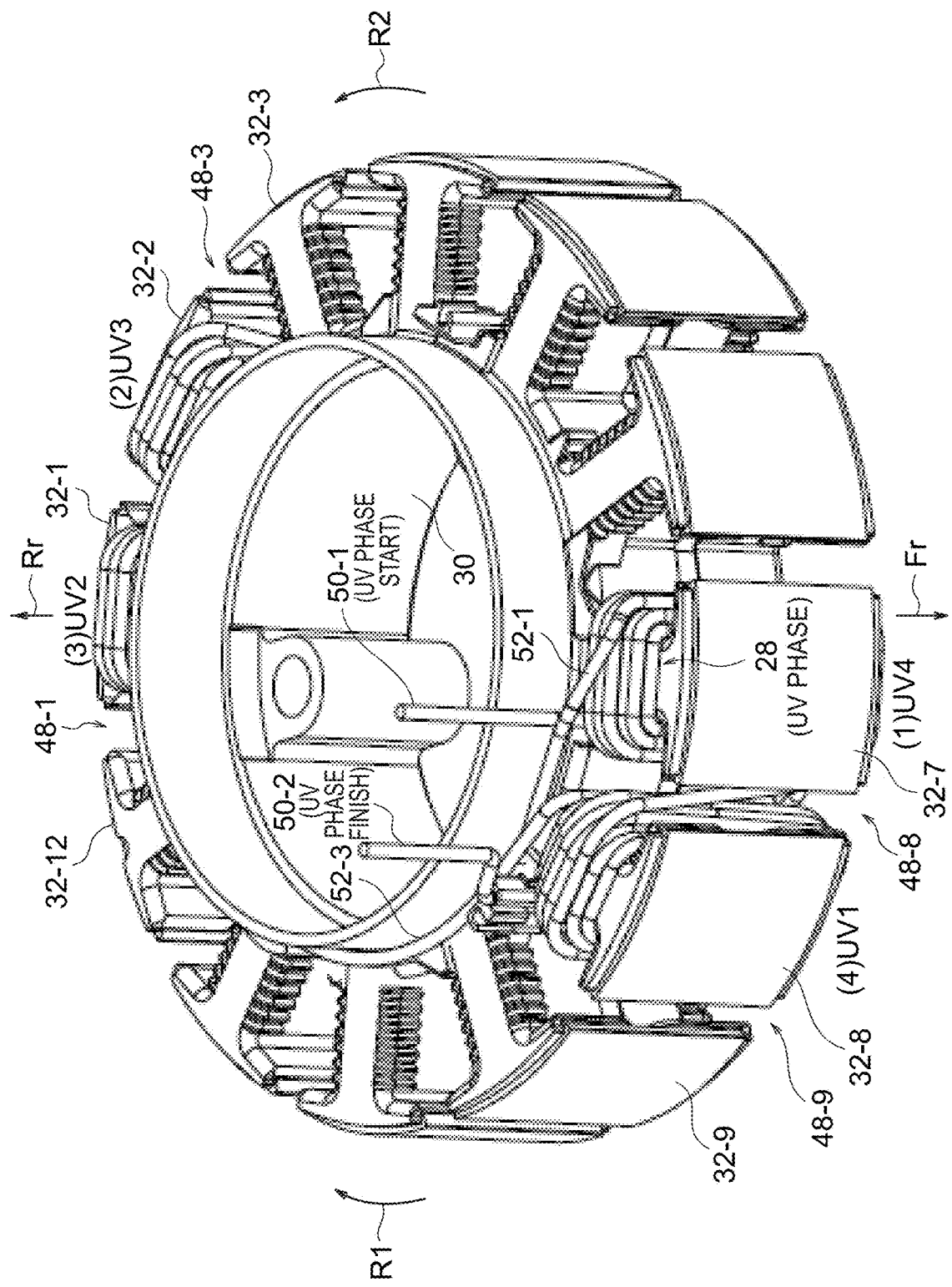

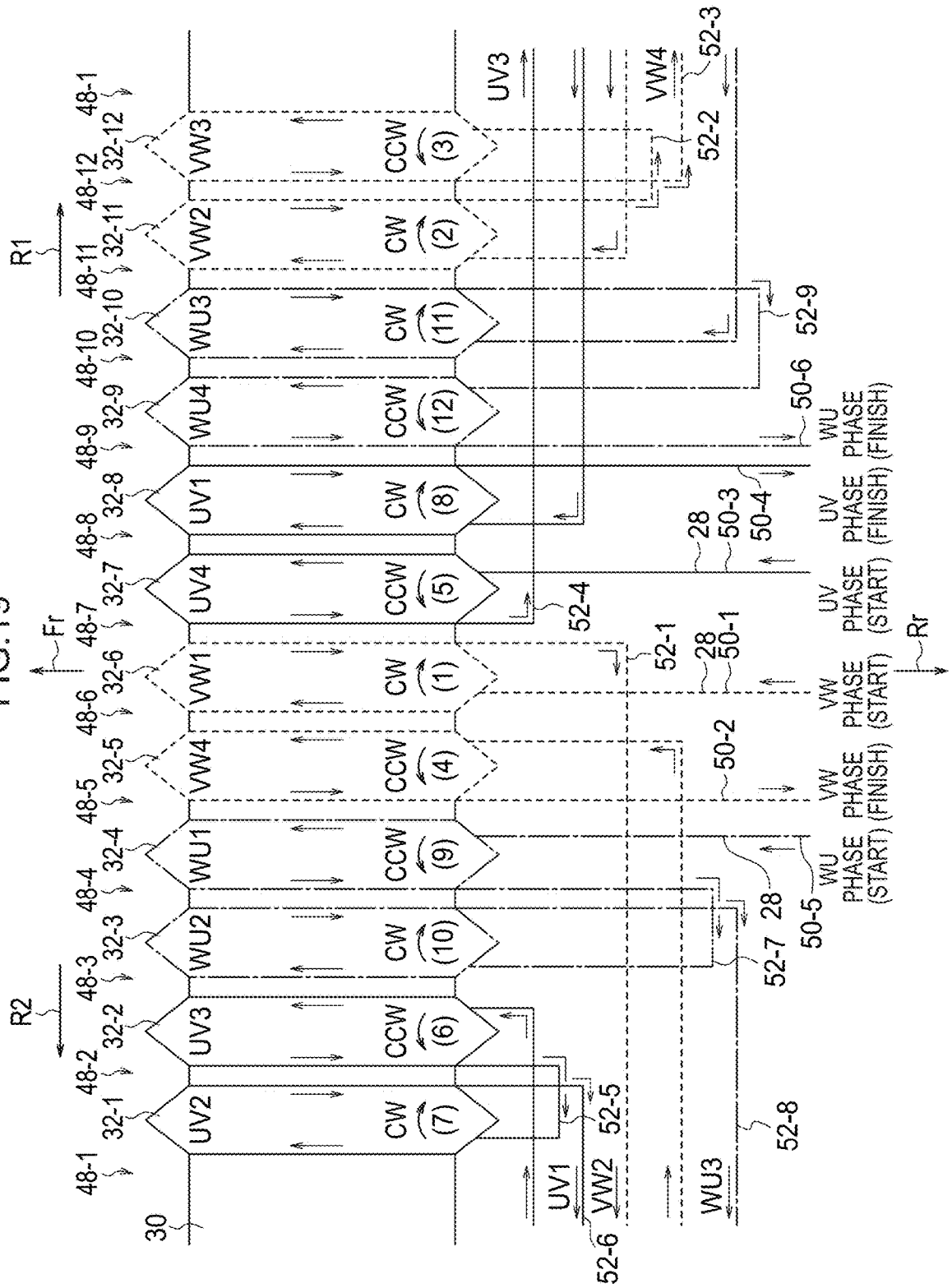

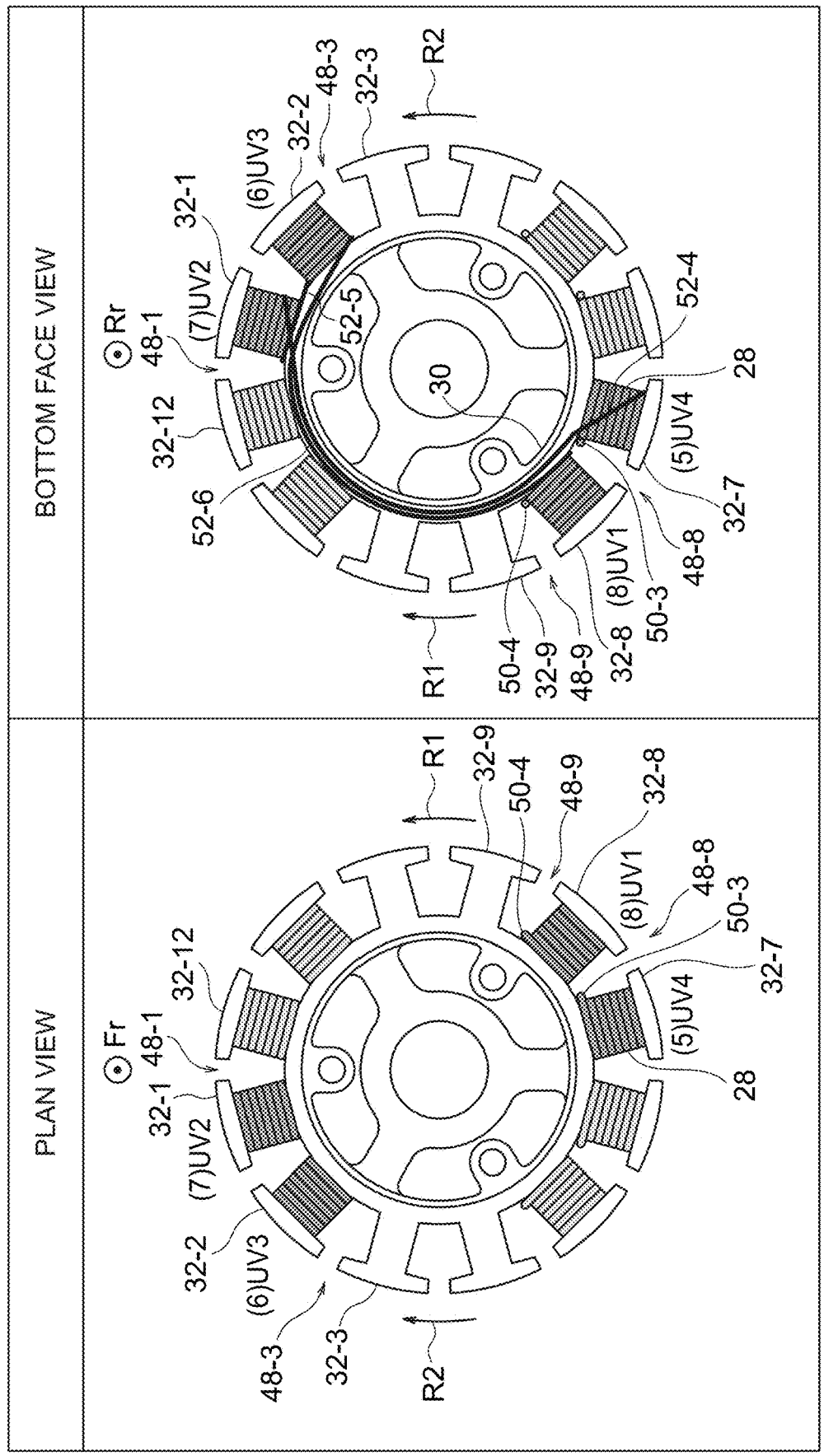

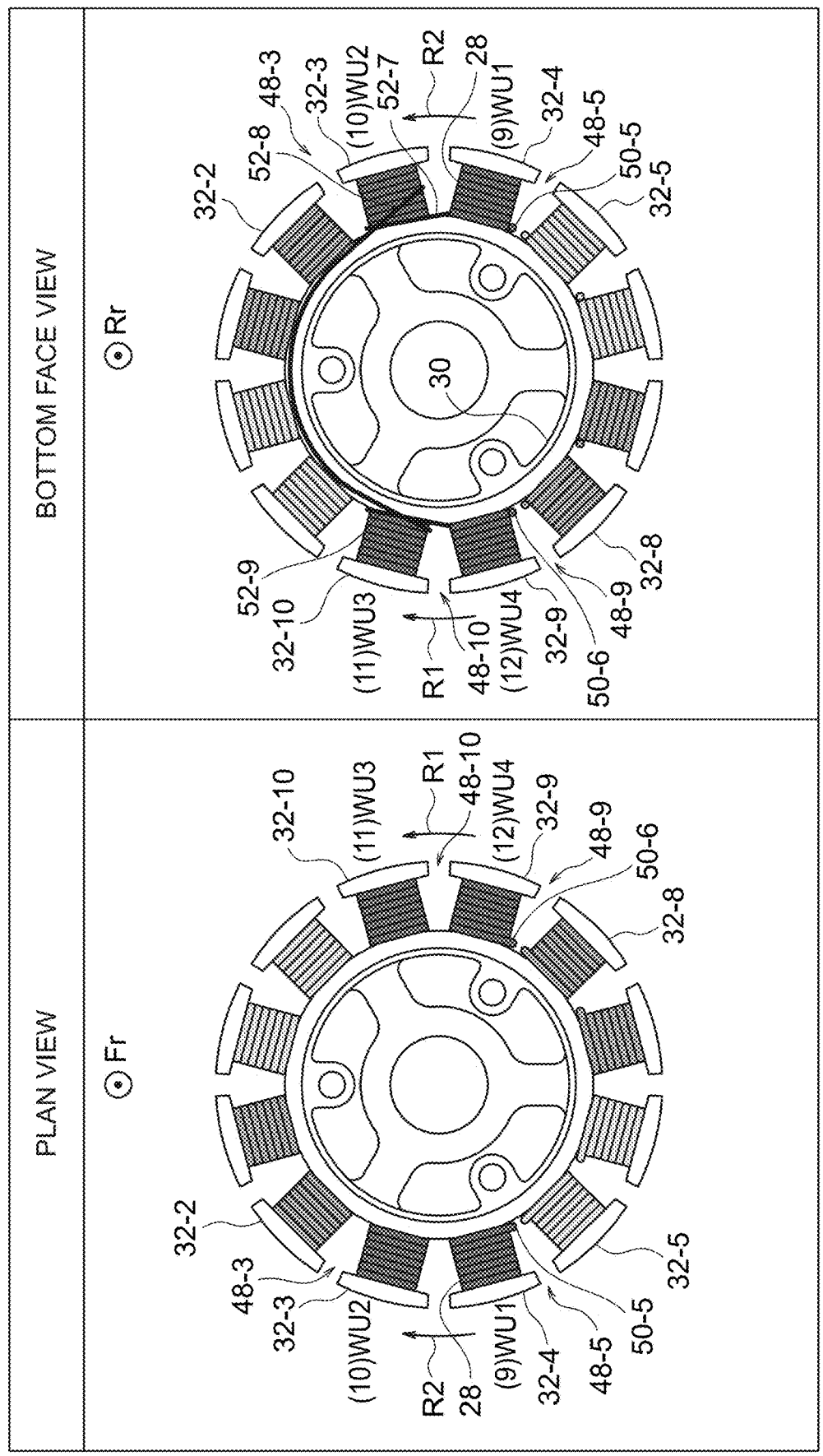

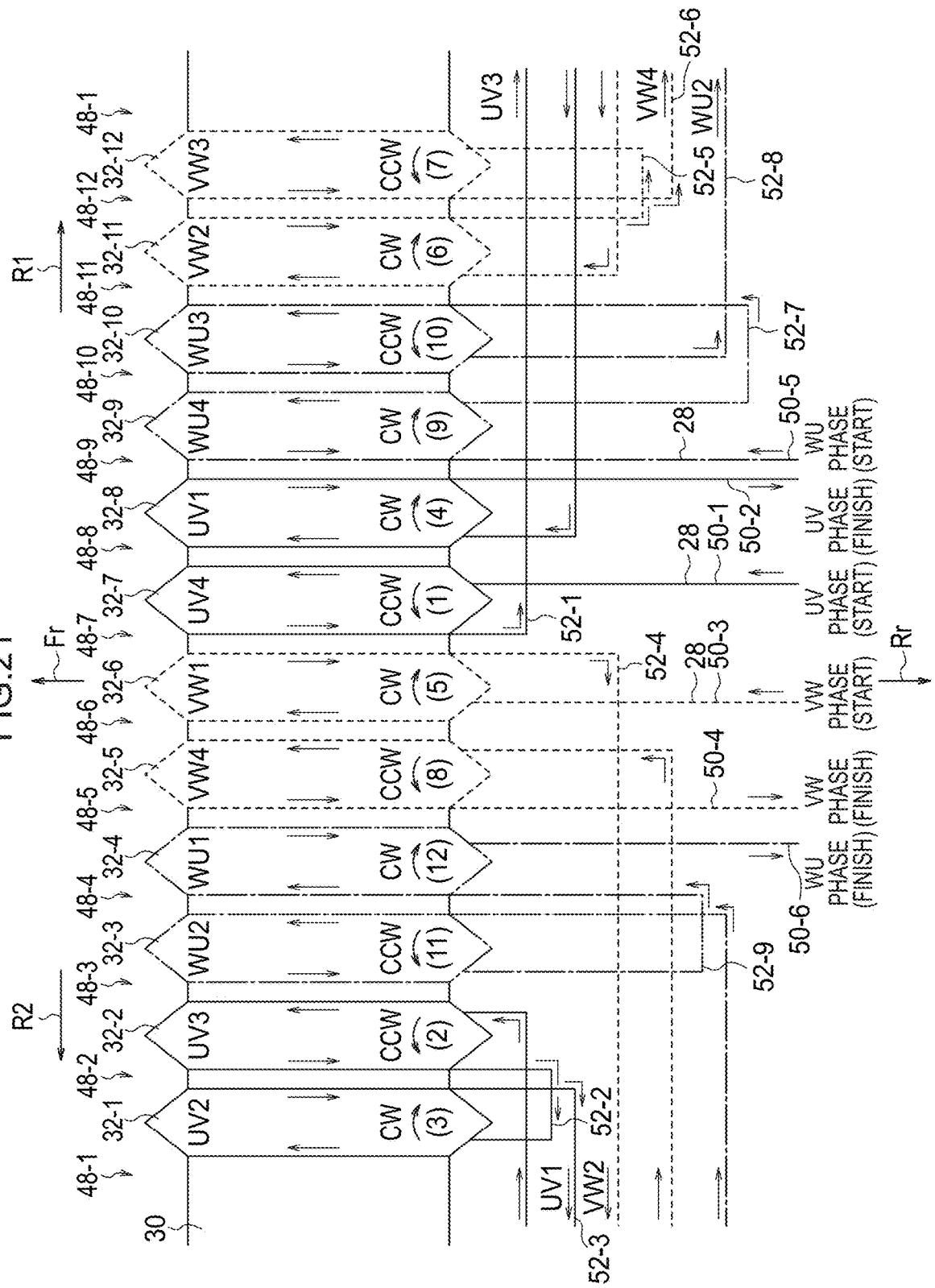

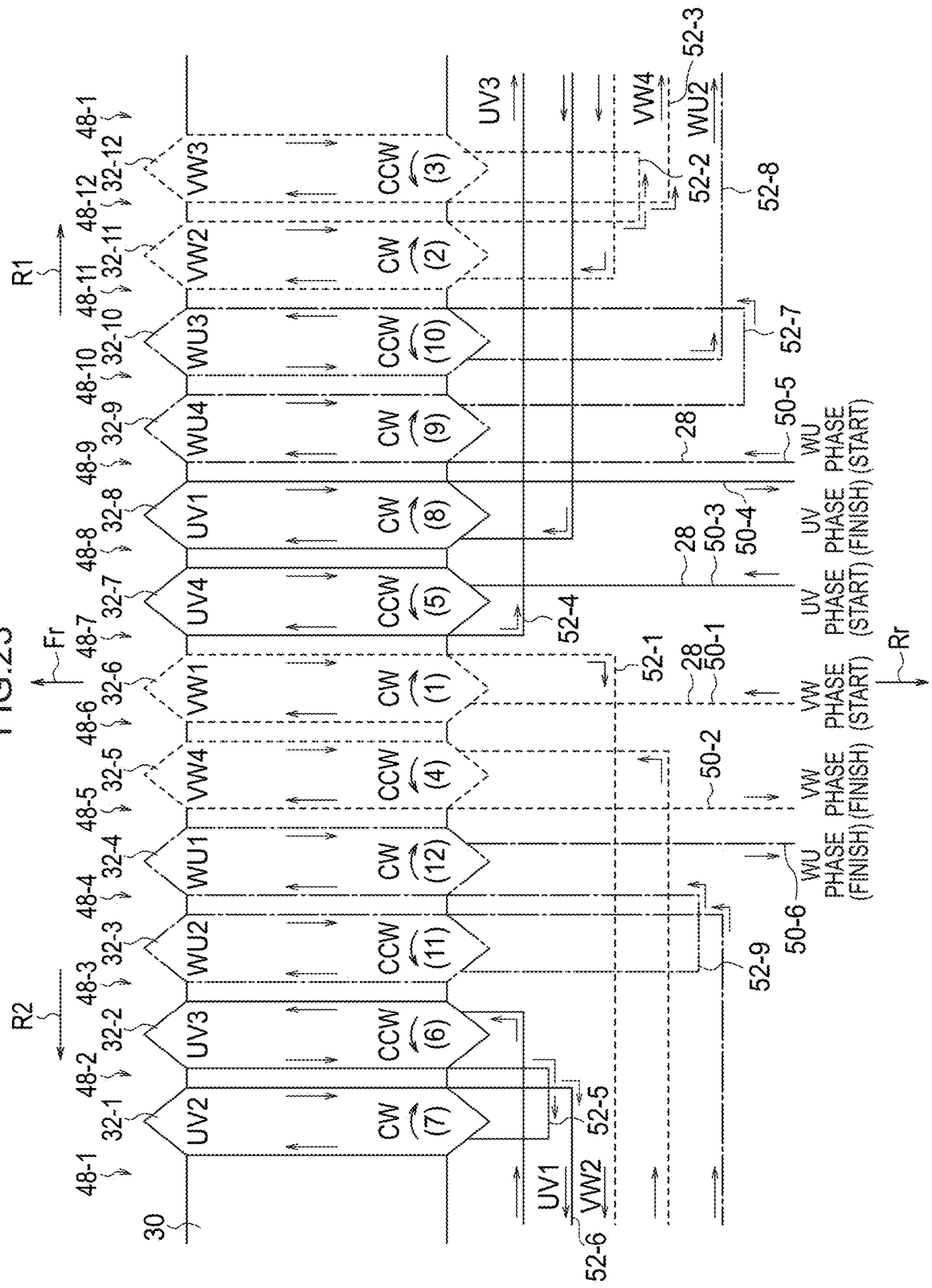

BRUSHLESS MOTOR

TECHNICAL FIELD

The present disclosure relates to a brushless motor.

BACKGROUND ART

For example, Japanese Patent No. 6291292 discloses a brushless motor including a stator, a rotor, and a circuit board. The stator of this brushless motor includes a stator core and plural windings. The stator core includes an annular section and plural teeth formed in a radial pattern at an outer side of the annular section. The plural windings are wound around the plural teeth.

The rotor includes a rotor housing and plural magnets. The rotor housing includes a top wall disposed on one axial direction side of the stator, and a peripheral wall surrounding the stator. The plural magnets are fixed to the peripheral wall.

The circuit board is disposed on the other axial direction side of the stator. Terminal portions of the plural windings extend to the other axial direction side of the stator and are electrically connected to the circuit board.

This brushless motor is an outrunner type of brushless motor configured such that the number of magnetic poles of the plural magnets and the number of slots between the plural teeth respectively equal either ten poles and twelve slots, or fourteen poles and twelve slots. The plural windings are configured by delta-connected three-phase windings.

In this brushless motor, the plural windings are formed with plural crossover wires that are routed so as to follow the annular section of the stator core. Some of the plural crossover wires are arranged on the one axial direction side of the annular section (i.e. on the top wall side of the rotor housing), and the remaining crossover wires are arranged on the other axial direction side of the annular section (i.e. on the opposite side to the top wall of the rotor housing).

The terminal portions of the plural windings extend to the other axial direction side (the circuit board side) of the stator. The terminal portions of the plural windings are consolidated on one side of a central axis of the brushless motor in a direction orthogonal to the axial direction of the brushless motor.

Cases in which the terminal portions of the plural windings are consolidated on one side of the central axis of the brushless motor in a direction orthogonal to the axial direction of the brushless motor in this manner enable, for example, the structure of terminals for connecting to the terminal portions of the plural windings to be simplified, thereby enabling any increase in cost to be suppressed.

SUMMARY OF INVENTION

Technical Problem

In the above-described brushless motor, some of the plural crossover wires are arranged on the one axial direction side of the annular section of the stator core (i.e. on the top wall side of the rotor housing). Thus, for example, in cases in which a fan is fixed to a top wall of the rotor housing using screws, the screws and the crossover wires may get in the way of one another.

A gap between the top wall of the rotor housing and the crossover wires could be widened in order to suppress the screws and the crossover wires from getting in the way of one another. However, doing so would lead to an increase in the size of the brushless motor in the axial direction.

In consideration of the above issues, an object of one aspect of the present disclosure is to provide a brushless motor that is capable of both suppressing an increase in axial direction size and suppressing an increase in cost.

Solution to Problem

In order to address the above issues, a brushless motor according to a first aspect of the present disclosure includes a stator that includes a stator core having an annular section and plural teeth formed in a radial pattern around an outer side of the annular section, the stator also including plural windings wound around the plural teeth, a rotor that includes a rotor housing having a top wall disposed on one axial direction side of the stator and a peripheral wall surrounding the stator, the rotor also including plural magnets fixed to the peripheral wall, and a circuit board that is disposed on another axial direction side of the stator and that is electrically connected to terminal portions of the plural windings, the terminal portions extending to the other axial direction side of the stator. The brushless motor is an outrunner type of brushless motor configured such that a number of magnetic poles of the plural magnets and a number of slots between the plural teeth respectively equal either ten poles and twelve slots or fourteen poles and twelve slots, and the plural windings are configured by delta-connected three-phase windings. When the plural teeth are sequentially denoted as a first tooth to a twelfth tooth on progression toward one circumferential direction side of the stator, in a first phase winding, a winding-start terminal portion of the first phase winding is placed in an eighth slot between the seventh tooth and the eighth tooth, the first phase winding is wound in a counterclockwise direction around the seventh tooth as viewed from a leading end side of the seventh tooth, and a crossover wire is then routed toward the one circumferential direction side of the annular section on the other axial direction side of the annular section, the first phase winding is then inserted into a third slot between the second tooth and the third tooth and wound in a counterclockwise direction around the second tooth as viewed from a leading end side of the second tooth, and a crossover wire is then routed toward another circumferential direction side of the annular section on the other axial direction side of the annular section, the first phase winding is then inserted into a first slot between the first tooth and the twelfth tooth and wound in a clockwise direction around the first tooth as viewed from a leading end side of the first tooth, and a crossover wire is then routed toward the other circumferential direction side of the annular section on the other axial direction side of the annular section, and the first phase winding is then inserted into the eighth slot between the seventh tooth and the eighth tooth and wound in a clockwise direction around the eighth tooth as viewed from a leading end side of the eighth tooth, and a winding-finish terminal portion of the first phase winding is then placed in a ninth slot between the eighth tooth and the ninth tooth. In a second phase winding, a winding-start terminal portion of the second phase winding is placed in a sixth slot between the fifth tooth and the sixth tooth, the second phase winding is wound in a clockwise direction around the sixth tooth as viewed from a leading end side of the sixth tooth, and a crossover wire is then routed toward the other circumferential direction side of the annular section on the other axial direction side of the annular section, the second phase winding is then inserted into an eleventh slot between the tenth tooth and the eleventh tooth and wound in a clockwise direction around the eleventh tooth as viewed from a leading end side of the eleventh tooth, and a crossover wire is then routed toward the one circumferential direction side of the annular section on the other axial direction side of the annular section, the second phase winding is then inserted into the first slot between the twelfth tooth and the first tooth and wound in a counterclockwise direction around the twelfth tooth as viewed from a leading end side of the twelfth tooth, and a crossover wire is then routed toward the one circumferential direction side of the annular section on the other axial direction side of the annular section, and the second phase winding is then inserted into the sixth slot between the fifth tooth and the sixth tooth and wound in a counterclockwise direction around the fifth tooth as viewed from a leading end side of the fifth tooth, and a winding-finish terminal portion of the second phase winding is then placed in a fifth slot between the fourth tooth and the fifth tooth. In a third phase winding, a winding-start terminal portion of the third phase winding is placed in the fifth slot between the fourth tooth and the fifth tooth, the third phase winding is wound in a counterclockwise direction around the fourth tooth as viewed from a leading end side of the fourth tooth, and a crossover wire is then routed toward the other circumferential direction side of the annular section on the other axial direction side of the annular section, the third phase winding is then inserted into the third slot between the second tooth and the third tooth and wound in a clockwise direction around the third tooth as viewed from a leading end side of the third tooth, and a crossover wire is then routed toward the other circumferential direction side of the annular section on the other axial direction side of the annular section, the third phase winding is then inserted into a tenth slot between the ninth tooth and the tenth tooth and wound in a clockwise direction around the tenth tooth as viewed from a leading end side of the tenth tooth, and a crossover wire is then routed toward the other circumferential direction side of the annular section on the other axial direction side of the annular section, and the third phase winding is then inserted into the tenth slot between the ninth tooth and the tenth tooth and wound in a counterclockwise direction around the ninth tooth as viewed from a leading end side of the ninth tooth, and a winding-finish terminal portion of the third phase winding is then placed in the ninth slot between the eighth tooth and the ninth tooth.

According to the brushless motor of the first aspect of the present disclosure, the crossover wires formed in the plural windings are all arranged on the other axial direction side of the annular section (i.e. on the opposite side to the top wall of the rotor housing). Accordingly, for example, screws and the crossover wires can be prevented from getting in the way of one another, even in cases in which a fan is fixed to the top wall of the rotor housing using screws. There is accordingly no need to widen any gap between the top wall of the rotor housing and the crossover wires, thereby enabling an increase in the axial direction size of the brushless motor to be suppressed.

Moreover, according to the brushless motor of the first aspect of the present disclosure, the terminal portions of the plural windings are placed in the fifth slot, the sixth slot, the eighth slot, and the ninth slot, and are thus consolidated on one side of a central axis of the brushless motor in a direction orthogonal to the axial direction of the brushless motor. Thus, in for example cases in which the terminal portions of the plural windings are directly connected to the circuit board, the layout of components on the circuit board that are connected to the terminal portions of the windings can be simplified, thereby enabling any increase in cost to be suppressed.

Moreover, in order to address the above issues, a brushless motor according to a second aspect of the present disclosure includes a stator that includes a stator core having an annular section and plural teeth formed in a radial pattern around an outer side of the annular section, the stator also including plural windings wound around the plural teeth, a rotor that includes a rotor housing having a top wall disposed on one axial direction side of the stator and a peripheral wall surrounding the stator, the rotor also including plural magnets fixed to the peripheral wall, and a circuit board that is disposed on another axial direction side of the stator and that is electrically connected to terminal portions of the plural windings, the terminal portions extending to the other axial direction side of the stator. The brushless motor is an outrunner type of brushless motor configured such that a number of magnetic poles of the plural magnets and a number of slots between the plural teeth respectively equal either ten poles and twelve slots or fourteen poles and twelve slots, and the plural windings are configured by delta-connected three-phase windings. When the plural teeth are sequentially denoted as a first tooth to a twelfth tooth on progression toward one circumferential direction side of the stator, in a first phase winding, a winding-start terminal portion of the first phase winding is placed in an eighth slot between the seventh tooth and the eighth tooth, the first phase winding is wound in a counterclockwise direction around the seventh tooth as viewed from a leading end side of the seventh tooth, and a crossover wire is then routed toward the one circumferential direction side of the annular section on the other axial direction side of the annular section, the first phase winding is then inserted into a third slot between the second tooth and the third tooth and wound in a counterclockwise direction around the second tooth as viewed from a leading end side of the second tooth, and a crossover wire is then routed toward another circumferential direction side of the annular section on the other axial direction side of the annular section, the first phase winding is then inserted into a first slot between the first tooth and the twelfth tooth and wound in a clockwise direction around the first tooth as viewed from a leading end side of the first tooth, and a crossover wire is then routed toward the other circumferential direction side of the annular section on the other axial direction side of the annular section, and the first phase winding is then inserted into the eighth slot between the seventh tooth and the eighth tooth and wound in a clockwise direction around the eighth tooth as viewed from a leading end side of the eighth tooth, and a winding-finish terminal portion of the first phase winding is then placed in a ninth slot between the eighth tooth and the ninth tooth. In a second phase winding, a winding-start terminal portion of the second phase winding is placed in a sixth slot between the fifth tooth and the sixth tooth, the second phase winding is wound in a clockwise direction around the sixth tooth as viewed from a leading end side of the sixth tooth, and a crossover wire is then routed toward the other circumferential direction side of the annular section on the other axial direction side of the annular section, the second phase winding is then inserted into an eleventh slot between the tenth tooth and the eleventh tooth and wound in a clockwise direction around the eleventh tooth as viewed from a leading end side of the eleventh tooth, and a crossover wire is then routed toward the one circumferential direction side of the annular section on the other axial direction side of the annular section, the second phase winding is then inserted into the first slot between the twelfth tooth and the first tooth and wound in a counterclockwise direction around the twelfth tooth as viewed from a leading end side of the twelfth tooth, and a crossover wire is then routed toward the one circumferential direction side of the annular section on the other axial direction side of the annular section, and the second phase winding is then inserted into the sixth slot between the fifth tooth and the sixth tooth and wound in a counterclockwise direction around the fifth tooth as viewed from a leading end side of the fifth tooth, and a winding-finish terminal portion of the second phase winding is then placed in a fifth slot between the fourth tooth and the fifth tooth. In a third phase winding, a winding-start terminal portion of the third phase winding is placed in the ninth slot between the ninth tooth and the eighth tooth, the third phase winding is wound in a clockwise direction around the ninth tooth as viewed from a leading end side of the ninth tooth, and a crossover wire is then routed toward the one circumferential direction side of the annular section on the other axial direction side of the annular section, the third phase winding is then inserted into the eleventh slot between the tenth tooth and the eleventh tooth and wound in a counterclockwise direction around the tenth tooth as viewed from a leading end side of the tenth tooth, and a crossover wire is then routed toward the one circumferential direction side of the annular section on the other axial direction side of the annular section, the third phase winding is then inserted into a fourth slot between the third tooth and the fourth tooth and wound in a counterclockwise direction around the third tooth as viewed from a leading end side of the third tooth, and a crossover wire is then routed toward the one circumferential direction side of the annular section on the other axial direction side of the annular section, and the third phase winding is then inserted into the fourth slot between the third tooth and the fourth tooth and wound in a clockwise direction around the fourth tooth as viewed from a leading end side of the fourth tooth, and a winding-finish terminal portion of the third phase winding is then placed in the fifth slot between the fourth tooth and the fifth tooth.

According to the brushless motor of the second aspect of the present disclosure, the crossover wires formed in the plural windings are all arranged on the other axial direction side of the annular section (i.e. on the opposite side to the top wall of the rotor housing). Accordingly, for example, screws and the crossover wires can be prevented from getting in the way of one another, even in cases in which a fan is fixed to the top wall of the rotor housing using screws. There is accordingly no need to widen any gap between the top wall of the rotor housing and the crossover wires, thereby enabling an increase in the axial direction size of the brushless motor to be suppressed.

Moreover, according to the brushless motor of the second aspect of the present disclosure, the terminal portions of the plural windings are placed in the fifth slot, the sixth slot, the eighth slot, and the ninth slot, and are thus consolidated on one side of a central axis of the brushless motor in a direction orthogonal to the axial direction of the brushless motor. Thus, in for example cases in which the terminal portions of the plural windings are directly connected to the circuit board, the layout of components on the circuit board that are connected to the terminal portions of the windings can be simplified, thereby enabling any increase in cost to be suppressed

BRIEF DESCRIPTION OF DRAWINGS

FIG. 8 is a wiring diagram illustrating a first example of a winding method for motor windings.

FIG. 9A is an explanatory diagram illustrating a winding process of a UV phase winding in the first example of a winding method for the windings.

FIG. 10 is a perspective view illustrating a state in which a UV phase winding has been wound onto a stator core.

FIG. 19 is a wiring diagram illustrating a second example of a winding method for motor windings.

FIG. 20B is an explanatory diagram illustrating a winding process of a VW phase winding in the second example of a winding method for the windings.

FIG. 20C is an explanatory diagram illustrating a winding process of a WU phase winding in the second example of a winding method for the windings.

FIG. 21 is a wiring diagram illustrating a third example of a winding method for motor windings.

FIG. 23 is a wiring diagram illustrating a fourth example of a winding method for motor windings.

DESCRIPTION OF EMBODIMENTS

First, explanation follows regarding a brushless motor 10 according to an exemplary embodiment of the present disclosure.

Figure 1:
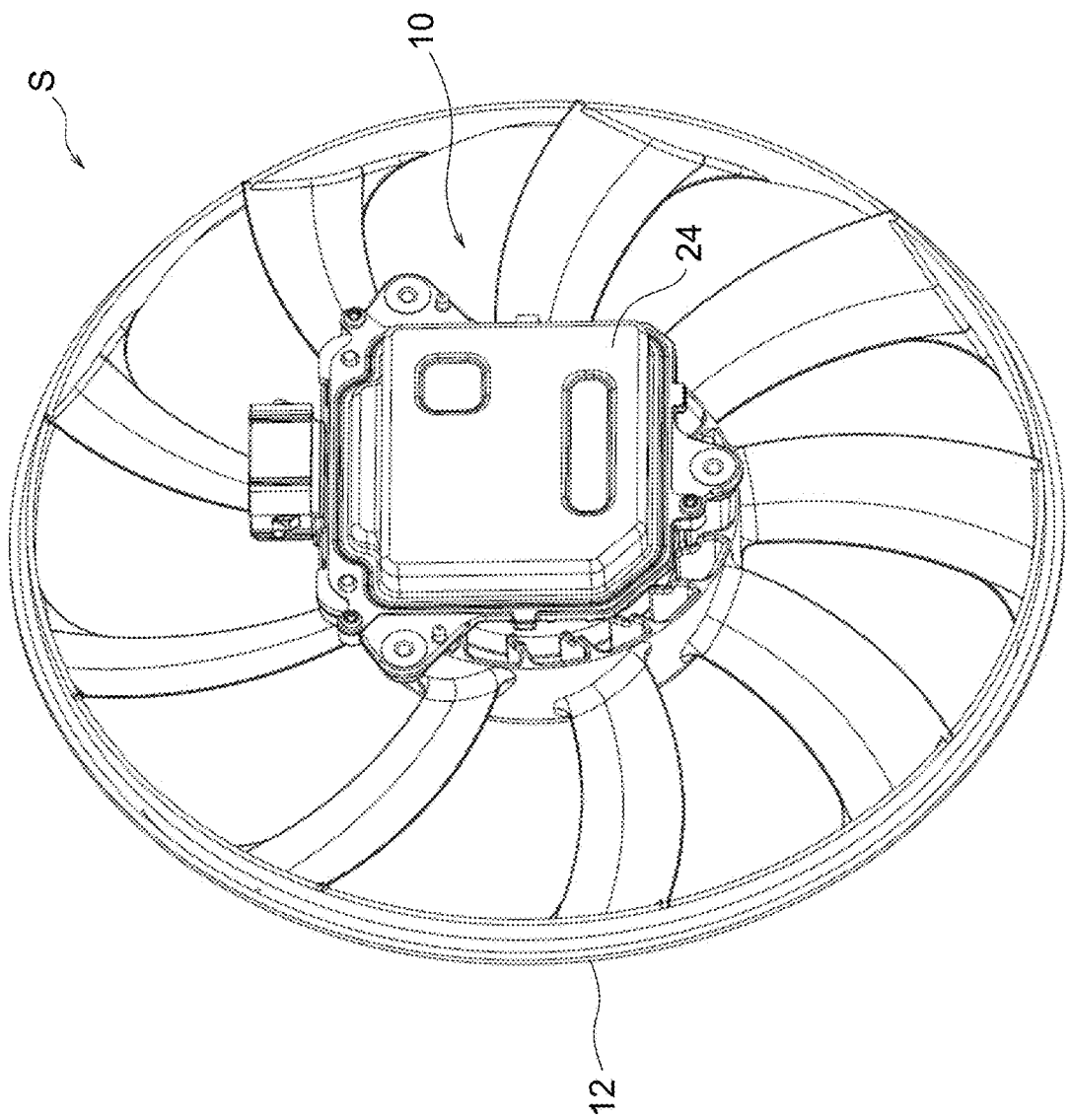
FIG. 1 is a perspective view illustrating a fan motor device including a brushless motor according to an exemplary embodiment of the present disclosure.

FIG. 1 illustrates an example in which the brushless motor 10 according to the present exemplary embodiment of the present disclosure is applied to a fan motor device S. The fan motor device S includes the brushless motor 10 and a fan 12.

Figure 2:
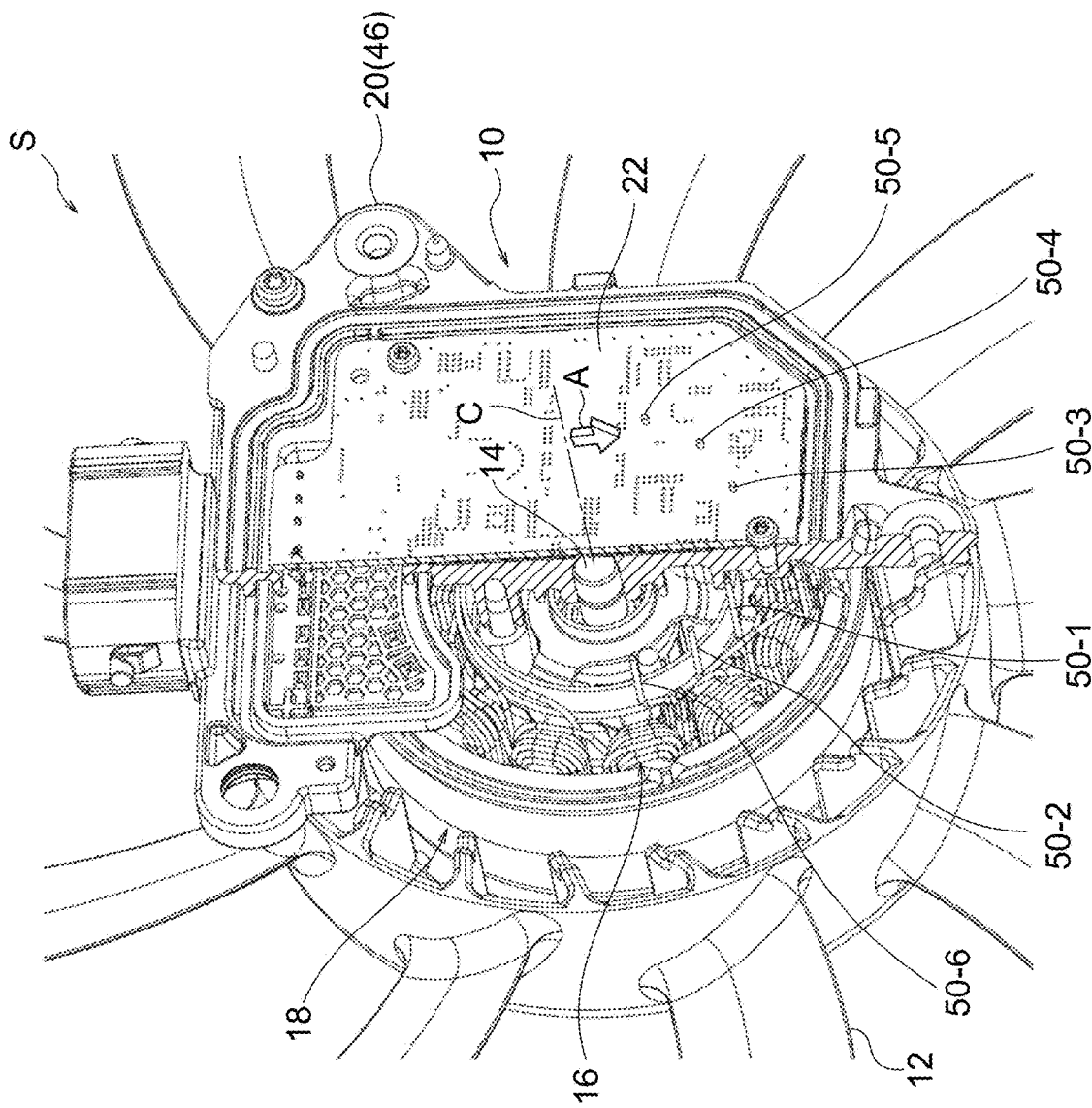
FIG. 2 is an enlarged perspective view illustrating a central section of a fan motor device.

FIG. 2 illustrates a central section of the fan motor device S. FIG. 2 illustrates a state in which a circuit board case 24, illustrated in FIG. 1, has been removed. As described later, the brushless motor 10 includes a circuit board 22.

Figure 3:
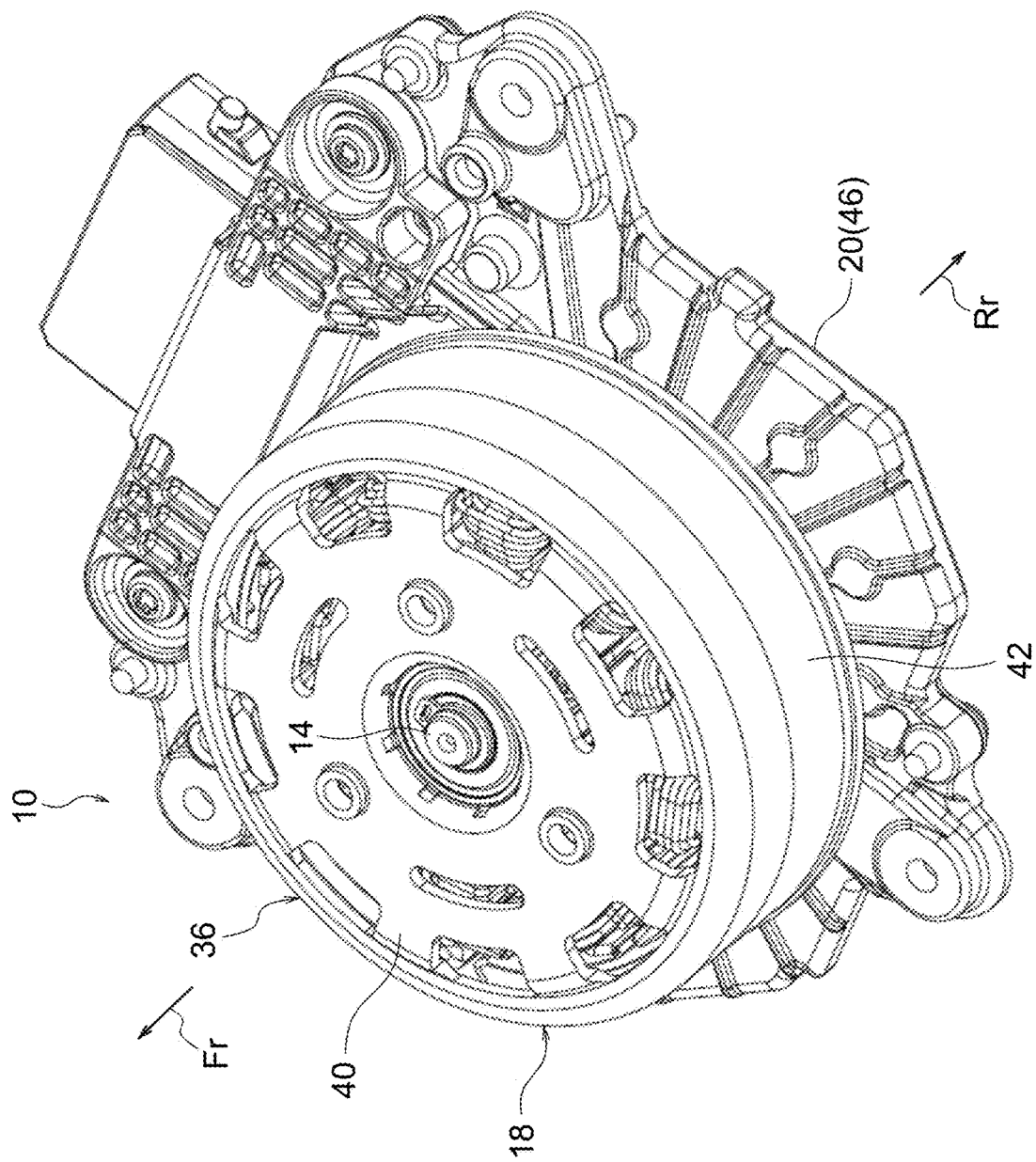
FIG. 3 is a perspective view illustrating a brushless motor.
Figure 4:
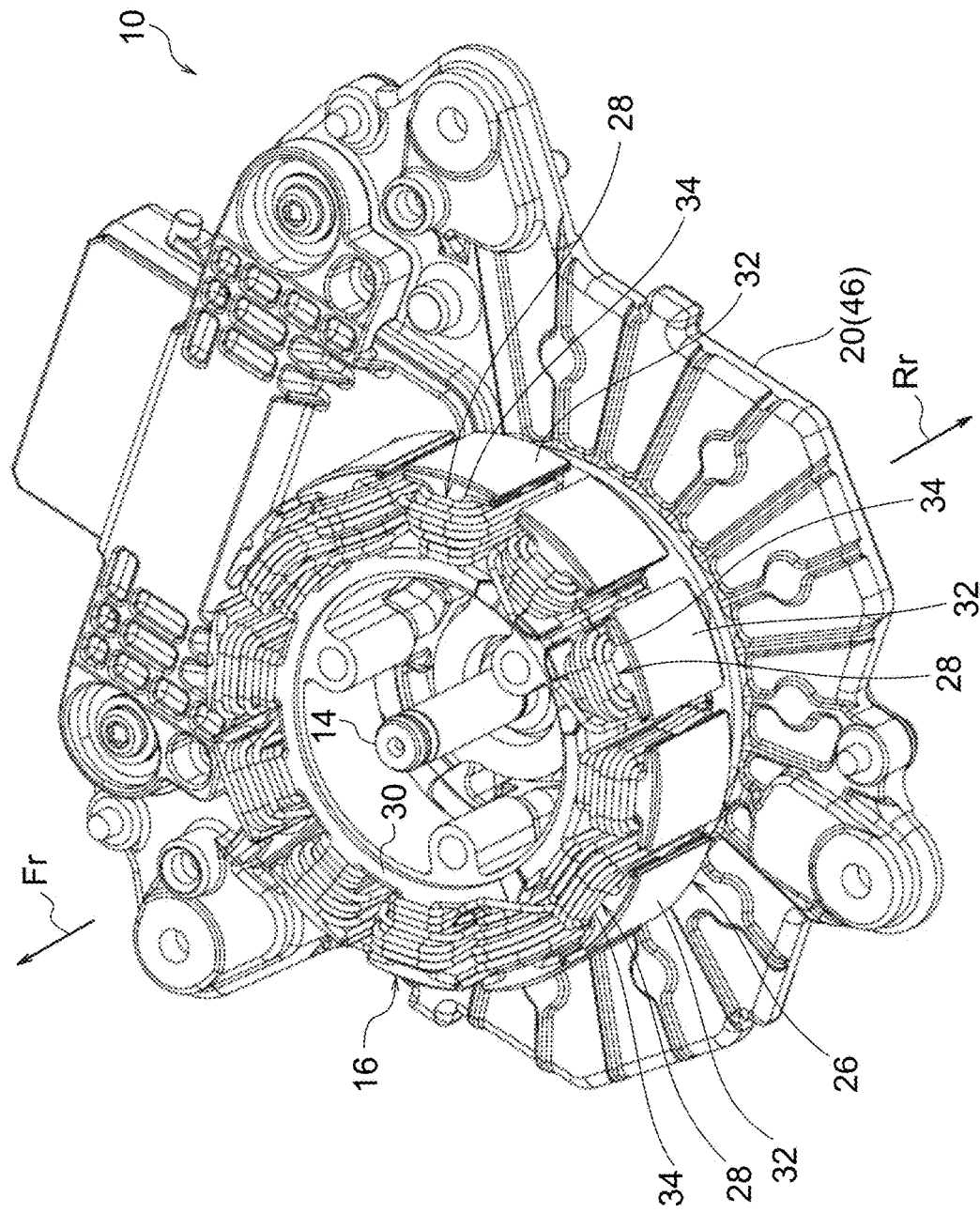
FIG. 4 is a perspective view illustrating a brushless motor in a state in which a rotor has been removed.
Figure 5:
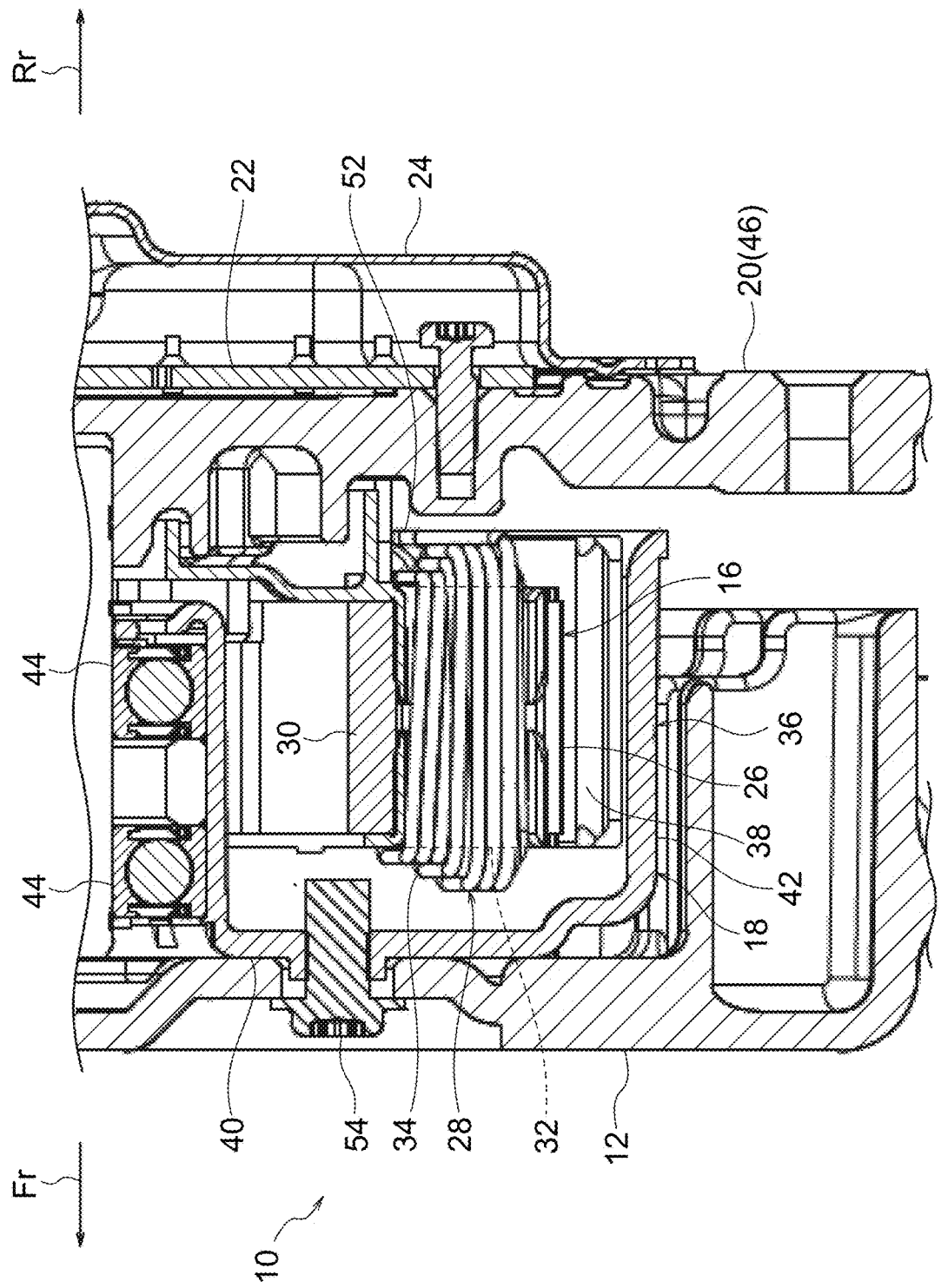
FIG. 5 is a vertical cross-section illustrating a brushless motor.

FIG. 3 is a perspective view of the brushless motor 10, FIG. 4 is a perspective view of the brushless motor 10 in a state in which a rotor 18 has been removed, and FIG. 5 is a vertical cross-section of the brushless motor 10. As illustrated in FIG. 3 to FIG. 5, the brushless motor 10 includes a shaft 14, a stator 16, the rotor 18, a centerpiece 20, the circuit board 22, and the circuit board case 24.

Figure 6:
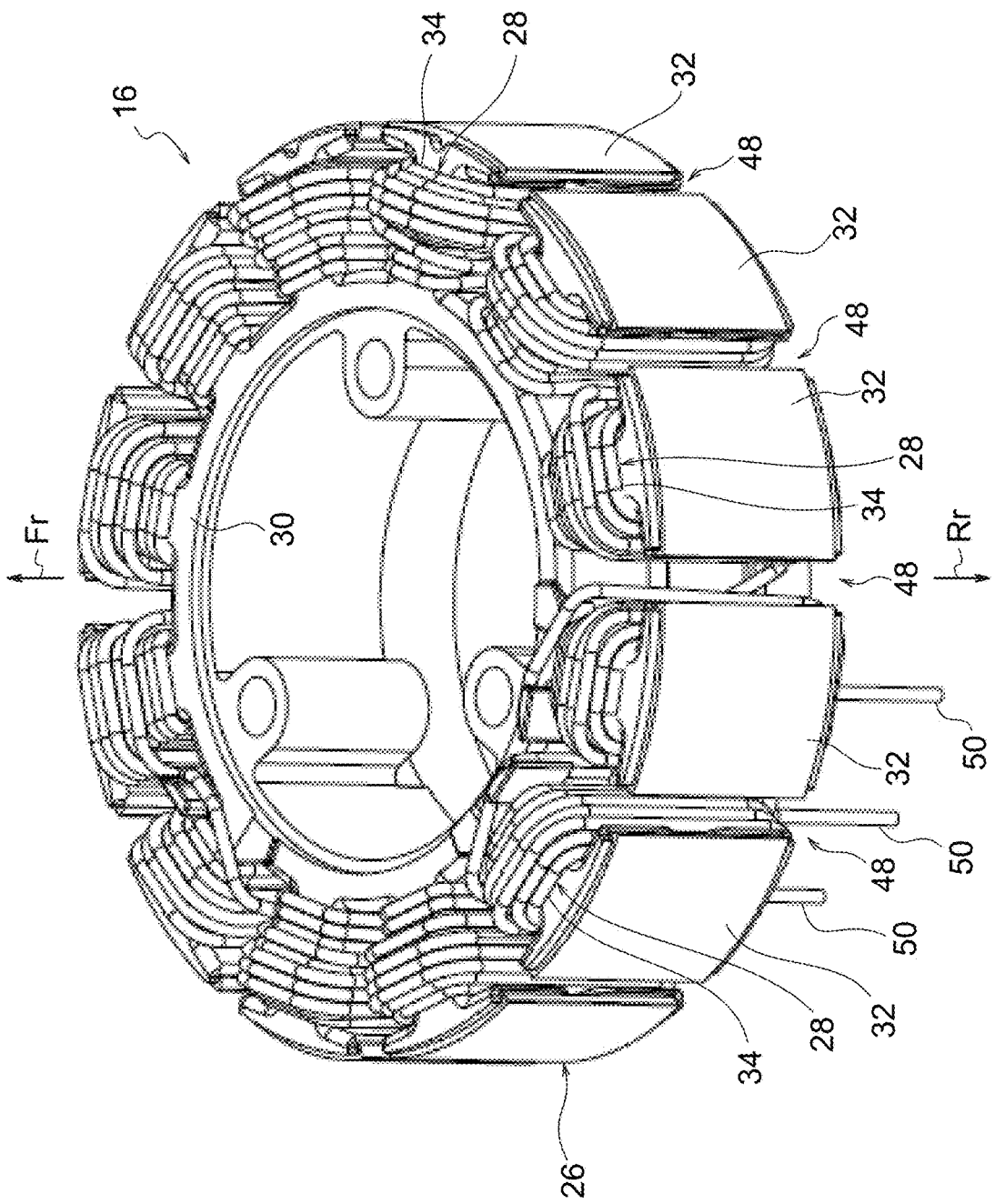
FIG. 6 is a perspective view illustrating a stator as viewed from one axial direction side.
Figure 7:
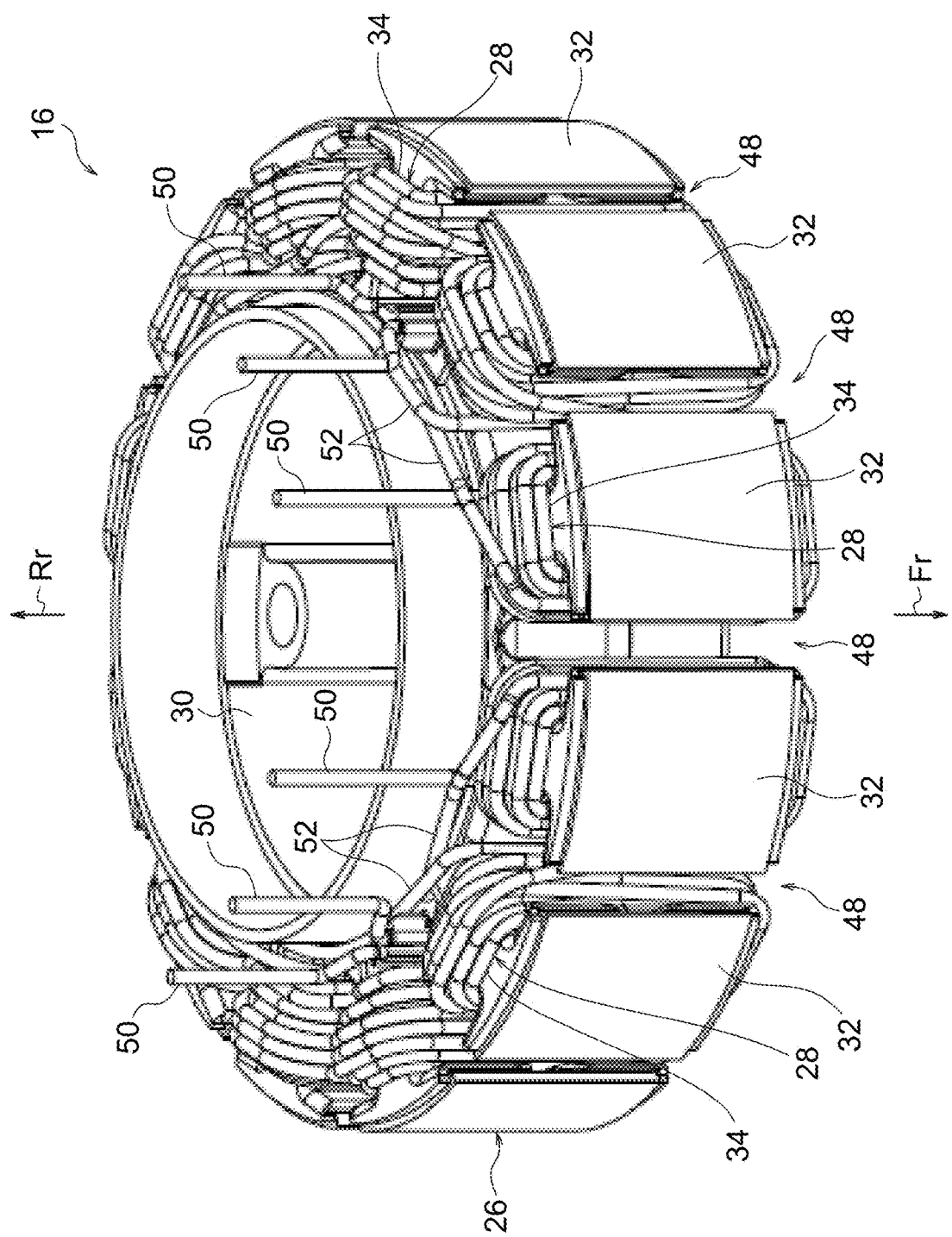
FIG. 7 is a perspective view illustrating a stator as viewed from another axial direction side.
Figure 9B:
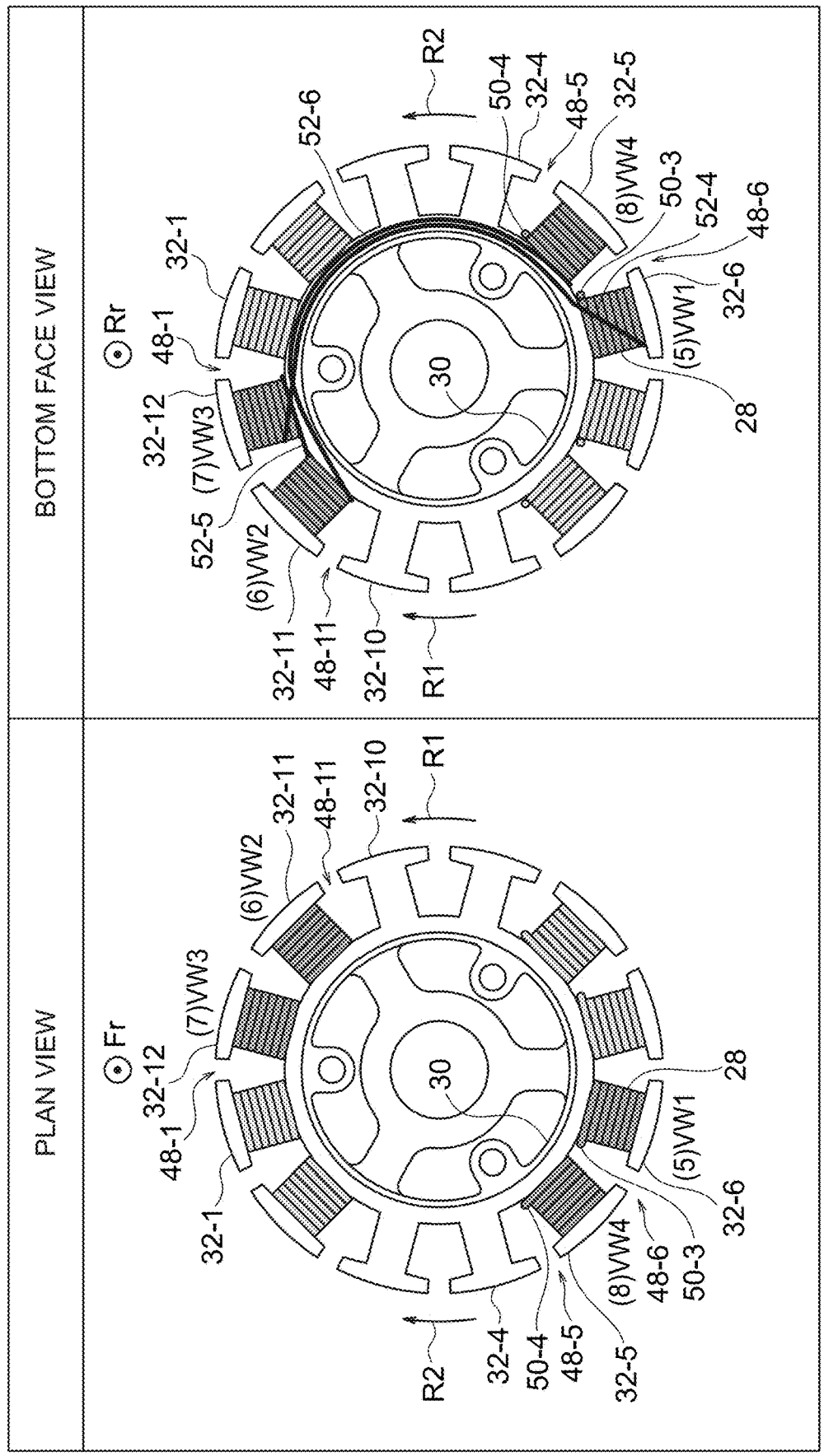
FIG. 9B is an explanatory diagram illustrating a winding process of a VW phase winding in the first example of a winding method for the windings.
Figure 9C:
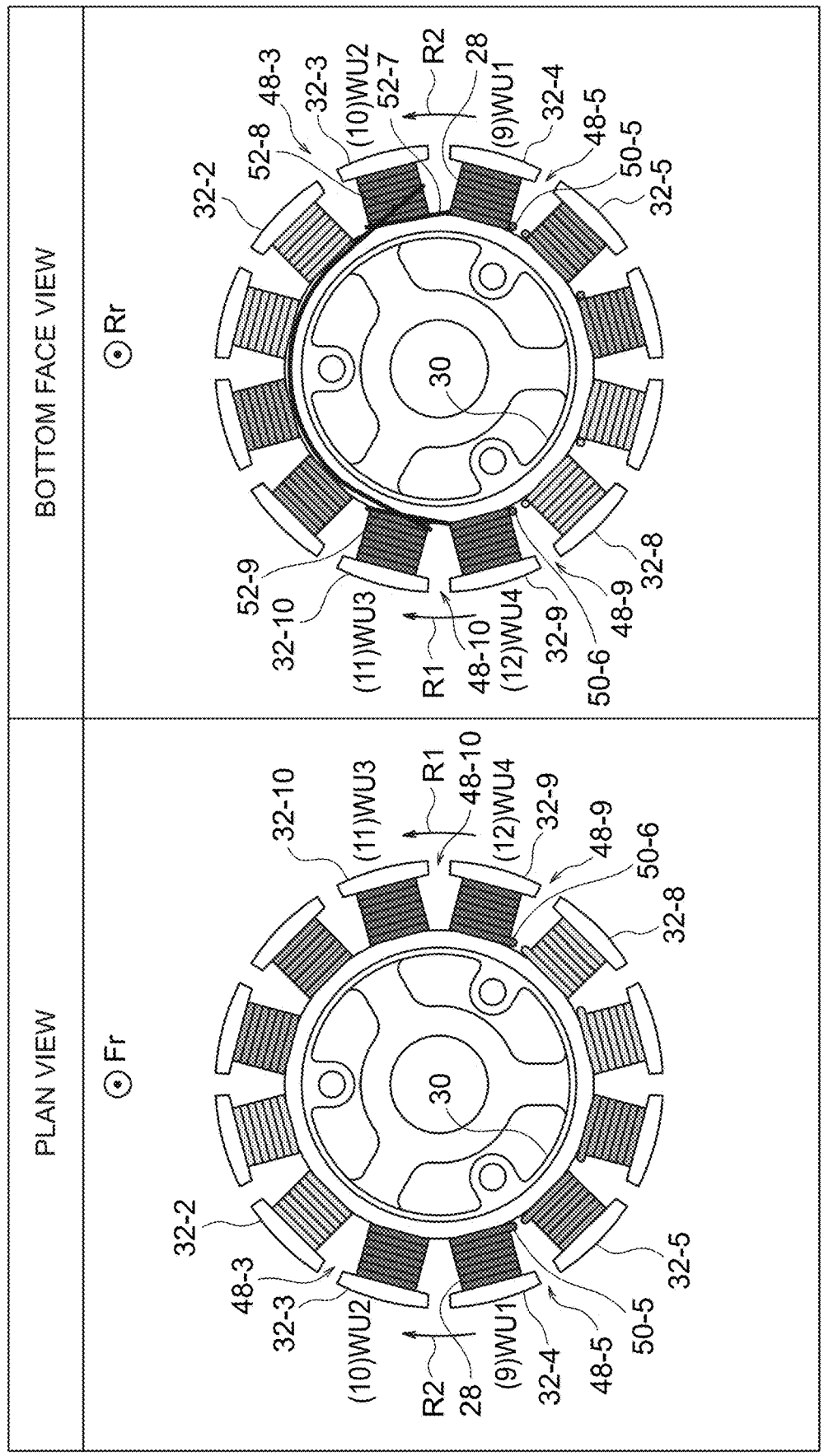
FIG. 9C is an explanatory diagram illustrating a winding process of a WU phase winding in the first example of a winding method for the windings.
Figure 11:
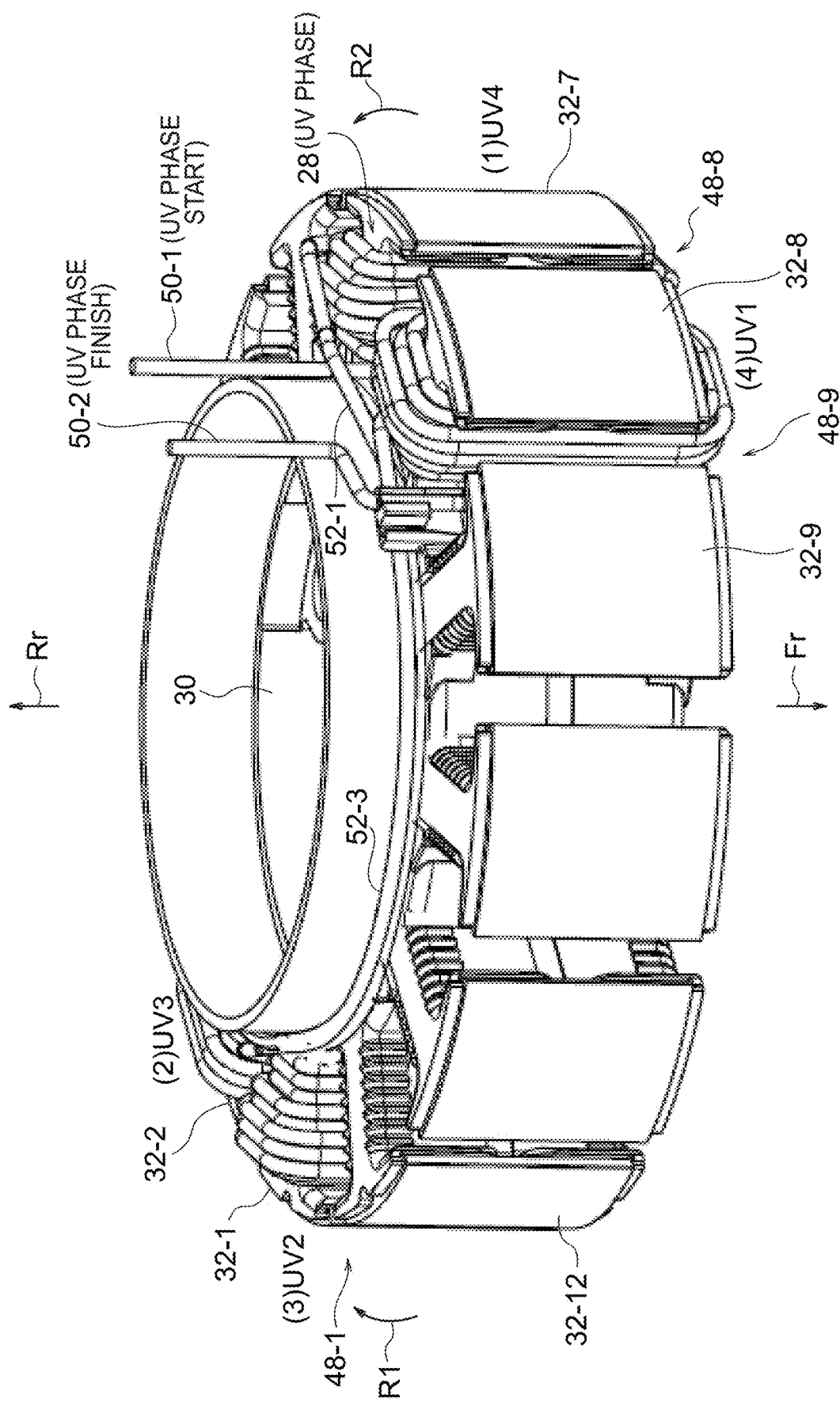
FIG. 11 is another perspective view illustrating a state in which a UV phase winding has been wound onto a stator core.
Figure 12:
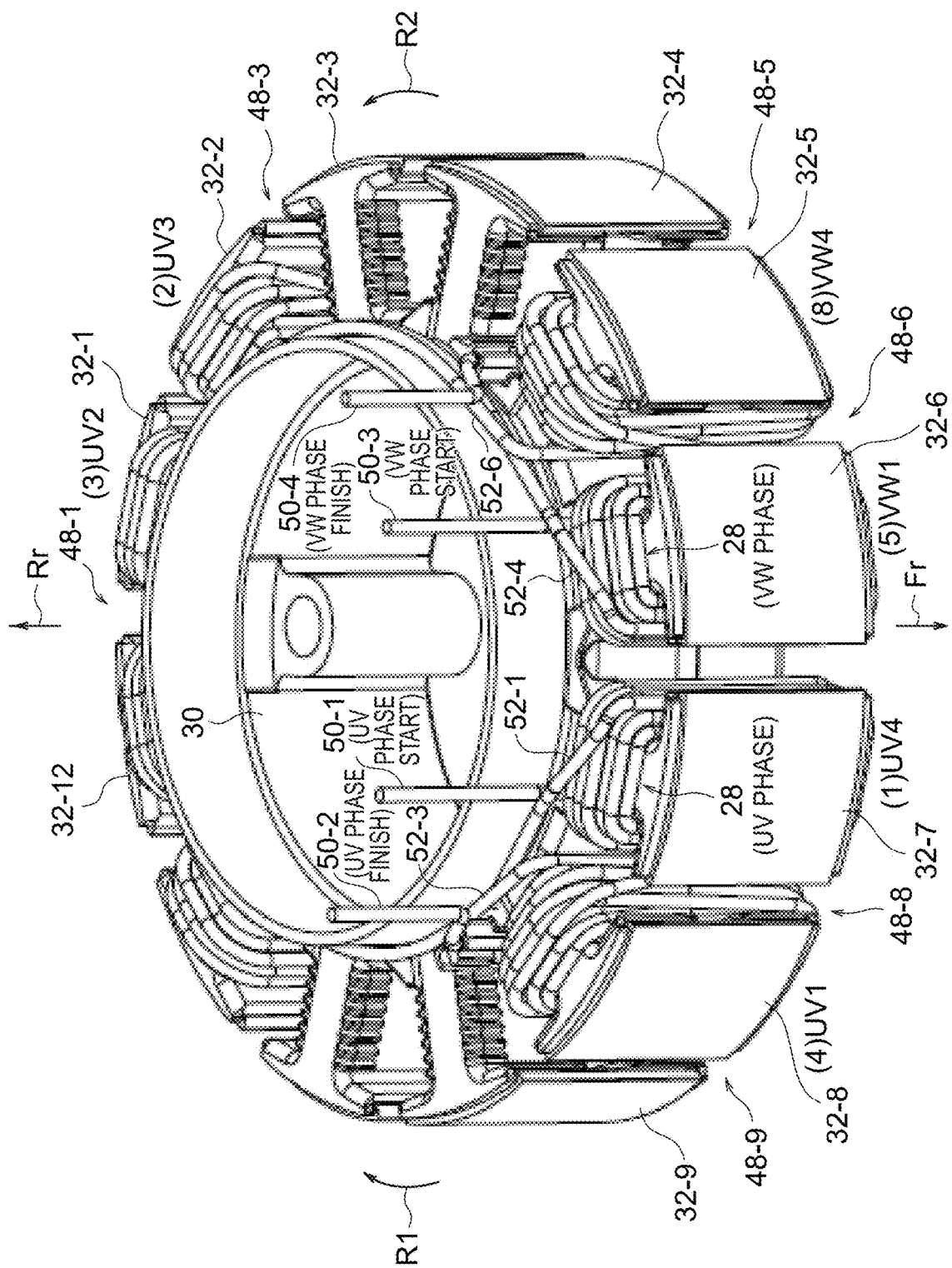
FIG. 12 is a perspective view illustrating a state in which UV phase and VW phase windings have been wound onto a stator core.
Figure 13:
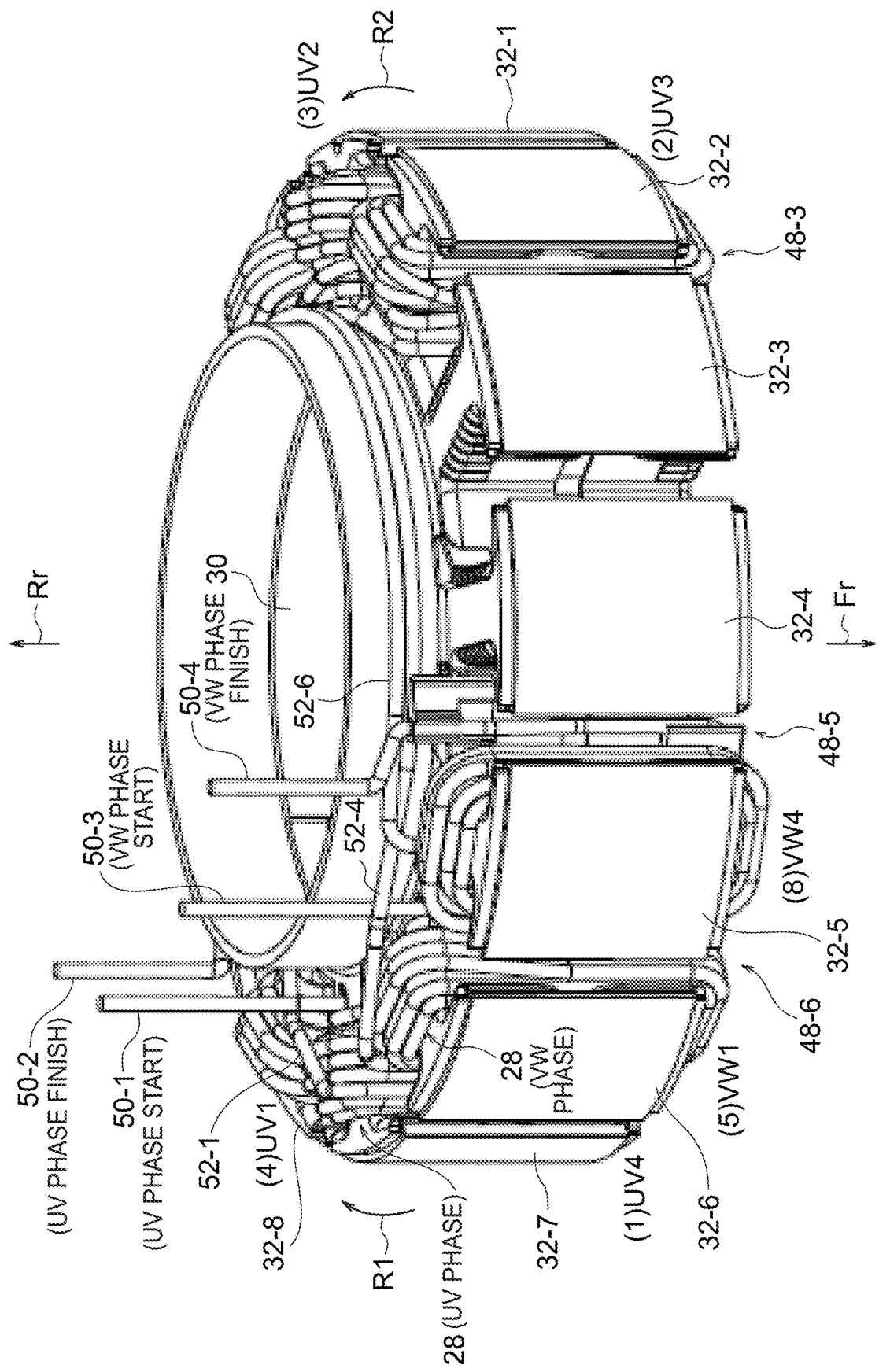
FIG. 13 is another perspective view illustrating a state in which UV phase and VW phase windings have been wound onto a stator core.
Figure 14:
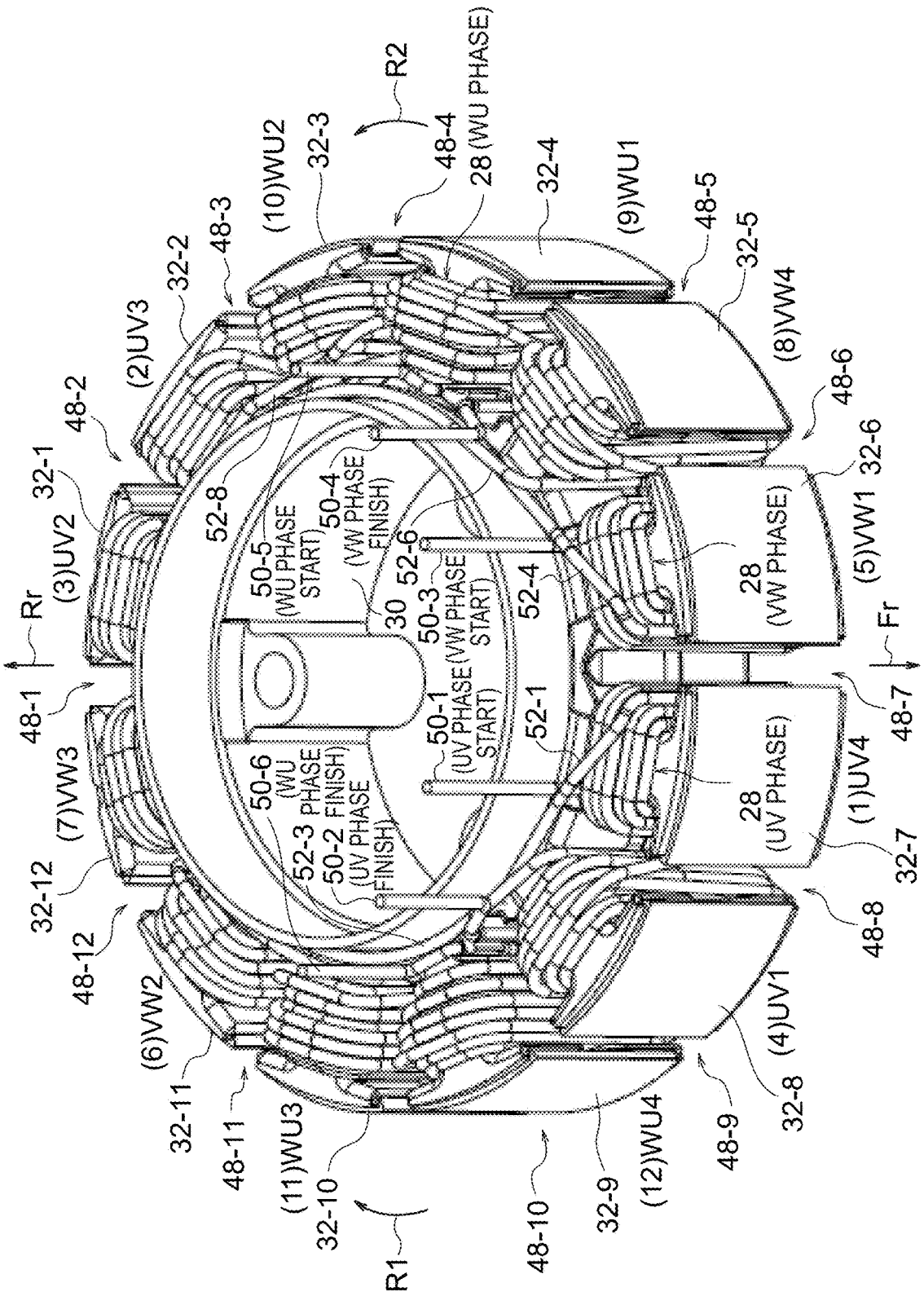
FIG. 14 is a perspective view illustrating a state in which UV phase, VW phase, and WU phase windings have been wound onto a stator core.
Figure 15:
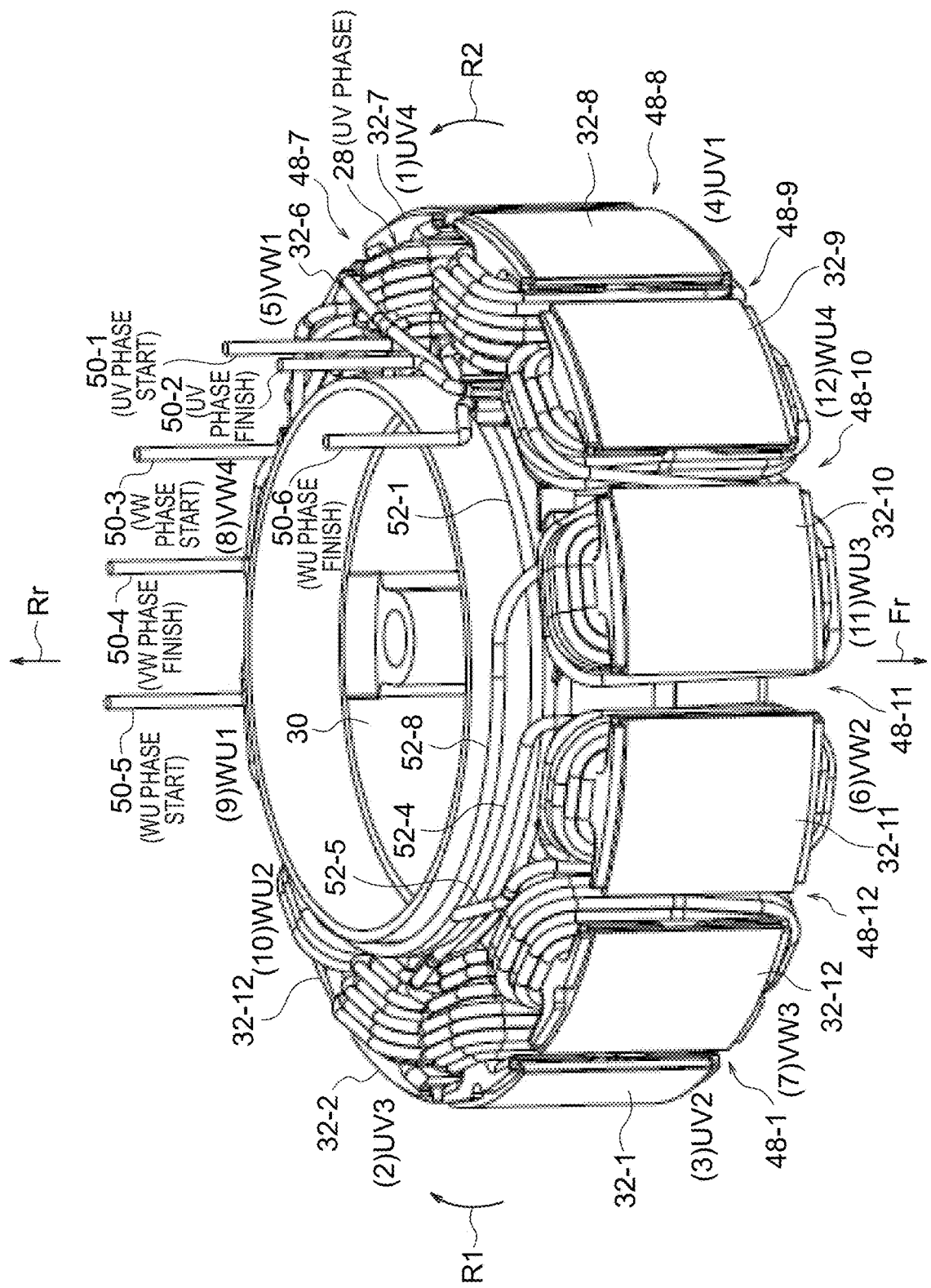
FIG. 15 is another perspective view illustrating a state in which UV phase, VW phase, and WU phase windings have been wound onto a stator core.
Figure 16:
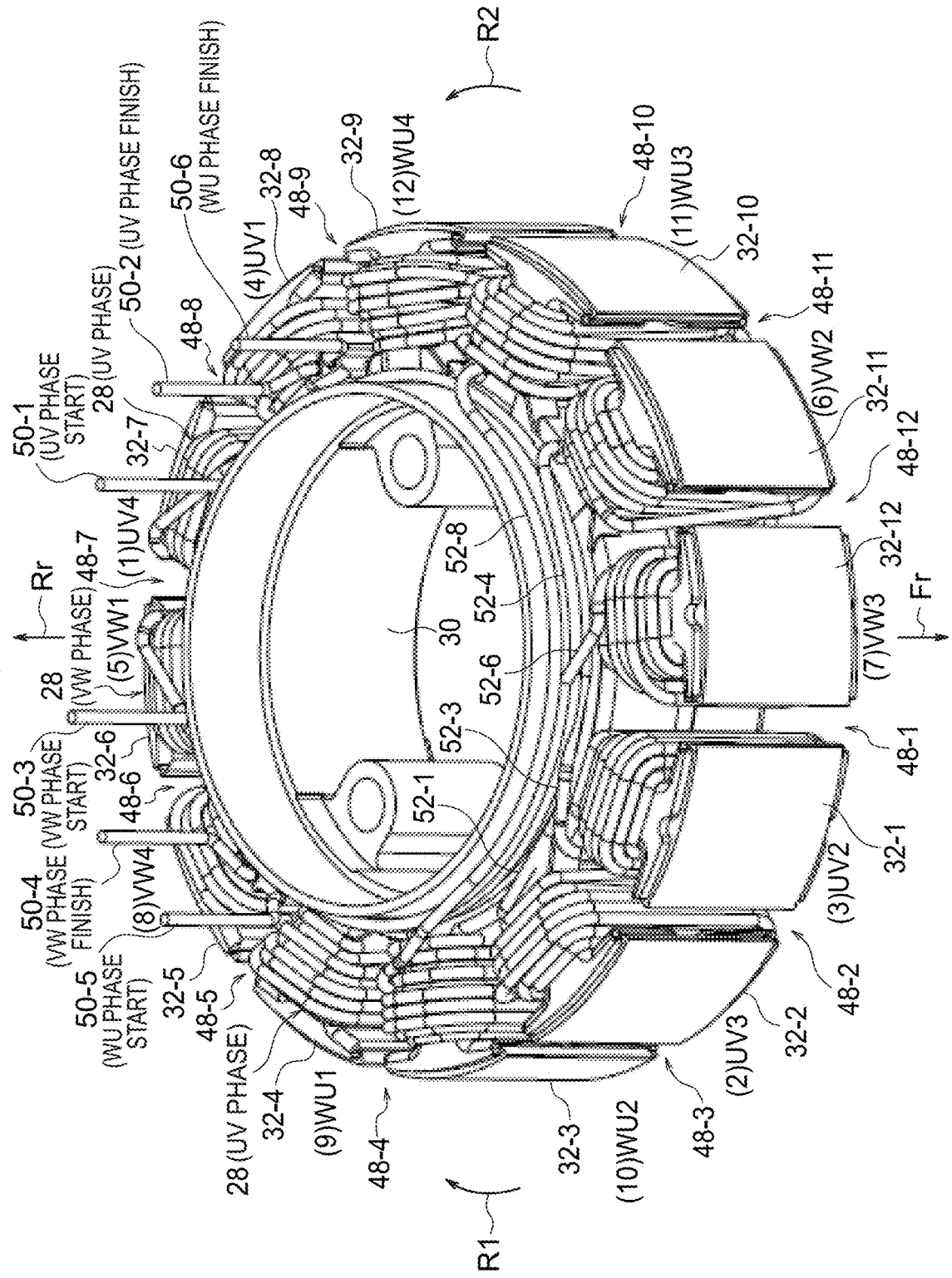
FIG. 16 is still another perspective view illustrating a state in which UV phase, VW phase, and WU phase windings have been wound onto a stator core.

FIG. 6 and FIG. 7 illustrate the stator 16. The arrow Fr indicates one axial direction side of the stator 16, and the arrow Rr indicates the other axial direction side of the stator 16. As illustrated in FIG. 6 and FIG. 7, the stator 16 includes a stator core 26 and plural windings 28. The stator core 26 includes an annular section 30, and plural teeth 32 formed in a radial pattern around an outer side of the annular section 30. The plural windings 28 include coils 34 that are respectively wound around the plural teeth 32.

As illustrated in FIG. 3 and FIG. 5, the rotor 18 includes a rotor housing 36 and plural magnets 38. The rotor housing 36 is formed in a lidded tubular shape, and includes a top wall 40 disposed on the one axial direction side of the stator 16 and a peripheral wall 42 surrounding the stator 16. The plural magnets 38 are fixed to the peripheral wall 42. The rotor 18 is rotatably supported by the shaft 14 through a pair of shaft bearings 44 interposed therebetween.

The centerpiece 20 includes a plate shaped portion 46 disposed on the other axial direction side of the stator 16. The shaft 14 and the stator 16 are both fixed to the centerpiece 20.

The circuit board 22 is disposed on the other axial direction side of the stator 16. More specifically, the circuit board 22 is disposed on the opposite side of the plate shaped portion 46 to the stator 16, and is fixed to the plate shaped portion 46. Terminal portions (not illustrated in FIG. 5) of the plural windings 28 extend to the other axial direction side of the stator 16 and are electrically connected to the circuit board 22.

The brushless motor 10 is an outrunner type of brushless motor configured such that the number of magnetic poles of the plural magnets 38 and the number of slots 48 between the plural teeth 32 respectively equal either ten poles and twelve slots, or fourteen poles and twelve slots.

The plural windings 28 are configured by delta-connected three-phase windings. Namely, the plural windings 28 are configured by a UV phase winding, a VW phase winding, and a WU phase winding. The UV phase winding 28 is an example of a "first phase winding", the VW phase winding 28 is an example of a "second phase winding", and the WU phase winding 28 is an example of a "third phase winding".

Next, explanation follows regarding winding methods for the plural windings 28. The present exemplary embodiment describes four winding methods for the plural windings 28, explained below as a first example to a fourth example. Explanation follows regarding the first example to the fourth example in sequence.

Note that UV1 to VW4 illustrated in the respective drawings represent the following:
UV1: First in the UV phase
UV2: Second in the UV phase
UV3: Third in the UV phase
UV4: Fourth in the UV phase
VW1: First in the VW phase
VW2: Second in the VW phase
VW3: Third in the VW phase
VW4: Fourth in the VW phase
WU1: First in the WU phase
WU2: Second in the WU phase
WU3: Third in the WU phase
WU4: Fourth in the WU phase Moreover, in the following explanation, the plural teeth 32 are sequentially referred to as a first tooth 32 to a twelfth tooth 32 on progression around the stator 16 toward one circumferential direction side of the stator 16. In the respective drawings, the reference numerals of the teeth 32 are suffixed with the numbers 1 to 12 indicating the sequence of the teeth 32, as indicated below.
First tooth 32: 32-1
Second tooth 32: 32-2
Third tooth 32: 32-3
Fourth tooth 32: 32-4
Fifth tooth 32: 32-5
Sixth tooth 32: 32-6
Seventh tooth 32: 32-7
Eighth tooth 32: 32-8
Ninth tooth 32: 32-9
Tenth tooth 32: 32-10
Eleventh tooth 32: 32-11
Twelfth tooth 32: 32-12

Moreover, in the following explanation, the slots 48 formed between the plural teeth 32 are sequentially referred to as a first slot 48 to a twelfth slot 48 on progression toward the one circumferential direction side of the stator 16. In the respective drawings, the reference numerals of the slots 48 are suffixed with the numbers 1 to 12 indicating the sequence of the slots 48, as indicated below.
First slot 48: 48-1
Second slot 48: 48-2
Third slot 48: 48-3
Fourth slot 48: 48-4
Fifth slot 48: 48-5
Sixth slot 48: 48-6

Seventh slot 48: 48-7
Eighth slot 48: 48-8
Ninth slot 48: 48-9
Tenth slot 48: 48-10
Eleventh slot 48: 48-11
Twelfth slot 48: 48-12

Moreover, the arrow Fr indicates the one axial direction side of the annular section 30, and the arrow Rr indicates the other axial direction side of the annular section 30. The arrow R1 indicates the one circumferential direction side of the annular section 30, and the arrow R2 indicates the other circumferential direction side of the annular section 30.

First, explanation follows regarding the first example of a winding method for the windings 28.

FIG. 8 to FIG. 18 illustrate how the plural windings 28 are wound in sequence according to the first example of a winding method for the windings 28. As illustrated in FIG. 8 to FIG. 18, in the first example of a winding method for the windings 28, the plural windings 28 are wound in sequence starting from the UV phase winding 28, followed by the VW phase winding 28, and finally the WU phase winding 28. FIG. 8 and FIG. 9A to FIG. 9C include the numbers (1) to (12) to indicate the sequence in which the windings 28 are wound around the plural teeth 32. FIG. 9A to FIG. 9C each include both a plan view and a bottom face view.

UV Phase Winding 28

First, a winding-start terminal portion 50-1 of the UV phase winding 28 is placed in the eighth slot 48-8 between the seventh (UV4) tooth 32-7 and the eighth (UV1) tooth 32-8. The UV phase winding 28 is then wound counterclockwise (CCW) around the seventh (UV4) tooth 32-7 as viewed from a leading end side of the tooth 32-7, and a crossover wire 52-1 is then routed toward the one circumferential direction side (R1 side) of the annular section 30 on the other axial direction side (Rr side) of the annular section 30.

Next, the UV phase winding 28 is inserted into the third slot 48-3 between the second (UV3) tooth 32-2 and the third (WU2) tooth 32-3. The UV phase winding 28 is then wound counterclockwise (CCW) around the second (UV3) tooth 32-2 as viewed from a leading end side of the tooth 32-2, and a crossover wire 52-2 is then routed toward the other circumferential direction side (R2 side) of the annular section 30 on the other axial direction side (Rr side) of the annular section 30.

Next, the UV phase winding 28 is inserted into the first slot 48-1 between the first (UV2) tooth 32-1 and the twelfth (VW3) tooth 32-12. The UV phase winding 28 is then wound clockwise (CW) around the first (UV2) tooth 32-1 as viewed from a leading end side of the tooth 32-1, and a crossover wire 52-3 is then routed toward the other circumferential direction side (R2 side) of the annular section 30 on the other axial direction side (Rr side) of the annular section 30.

Next, the UV phase winding 28 is inserted into the eighth slot 48-8 between the seventh (UV4) tooth 32-7 and the eighth (UV1) tooth 32-8. The UV phase winding 28 is then wound clockwise (CW) around the eighth (UV1) tooth 32-8 as viewed from a leading end side of the tooth 32-8, and a winding-finish terminal portion 50-2 is placed in the ninth slot 48-9 between the eighth (UV1) tooth 32-8 and the ninth (WU4) tooth 32-9. The UV phase winding 28 is thus wound in the above manner.

VW Phase Winding 28

Next, a winding-start terminal portion 50-3 of the VW phase winding 28 is placed in the sixth slot 48-6 between the fifth (VW4) tooth 32-5 and the sixth (VW1) tooth 32-6. The VW phase winding 28 is then wound clockwise (CW) around the sixth (VW1) tooth 32-6 as viewed from a leading end side of the tooth 32-6, and a crossover wire 52-4 is then routed toward the other circumferential direction side (R2 side) of the annular section 30 on the other axial direction side (Rr side) of the annular section 30.

Next, the VW phase winding 28 is inserted into the eleventh slot 48-11 between the tenth (WU3) tooth 32-10 and the eleventh (VW2) tooth 32-11. The VW phase winding 28 is then wound clockwise (CW) around the eleventh (VW2) tooth 32-11 as viewed from a leading end side of the tooth 32-11, and a crossover wire 52-5 is then routed toward the one circumferential direction side (R1 side) of the annular section 30 on the other axial direction side (Rr side) of the annular section 30.

Next, the VW phase winding 28 is inserted into the first slot 48-1 between the twelfth (VW3) tooth 32-12 and the first (UV2) tooth 32-1. The VW phase winding 28 is then wound counterclockwise (CCW) around the twelfth (VW3) tooth 32-12 as viewed from a leading end side of the tooth 32-12, and a crossover wire 52-6 is then routed toward the one circumferential direction side (R1 side) of the annular section 30 on the other axial direction side (Rr side) of the annular section 30.

Next, the VW phase winding 28 is inserted into the sixth slot 48-6 between the fifth (VW4) tooth 32-5 and the sixth (VW1) tooth 32-6. The VW phase winding 28 is then wound counterclockwise (CCW) around the fifth (VW4) tooth 32-5 as viewed from a leading end side of the tooth 32-5, and a winding-finish terminal portion 50-4 is placed in the fifth slot 48-5 between the fourth (WU1) tooth 32-4 and the fifth (VW4) tooth 32-5. The VW phase winding 28 is thus wound in the above manner.

WU Phase Winding 28

Next, a winding-start terminal portion 50-5 of the WU phase winding 28 is placed in the fifth slot 48-5 between the fourth (WU1) tooth 32-4 and the fifth (VW4) tooth 32-5. The WU phase winding 28 is then wound counterclockwise (CCW) around the fourth (WU1) tooth 32-4 as viewed from a leading end side of the tooth 32-4, and a crossover wire 52-7 is then routed toward the other circumferential direction side (R2 side) of the annular section 30 on the other axial direction side (Rr side) of the annular section 30.

Next, the WU phase winding 28 is inserted into the third slot 48-3 between the second (UV3) tooth 32-2 and the third (WU2) tooth 32-3. The WU phase winding 28 is then wound clockwise (CW) around the third (WU2) tooth 32-3 as viewed from a leading end side of the tooth 32-3, and a crossover wire 52-8 is then routed toward the other circumferential direction side (R2 side) of the annular section 30 on the other axial direction side (Rr side) of the annular section 30.

Next, the WU phase winding 28 is inserted into the tenth slot 48-10 between the ninth (WU4) tooth 32-9 and the tenth (WU3) tooth 32-10. The WU phase winding 28 is then wound clockwise (CW) around the tenth (WU3) tooth 32-10 as viewed from a leading end side of the tooth 32-10, and a crossover wire 52-9 is then routed toward the other circumferential direction side (R2 side) of the annular section 30 on the other axial direction side (Rr side) of the annular section 30.

Next, the WU phase winding 28 is inserted into the tenth slot 48-10 between the ninth (WU4) tooth 32-9 and the tenth (WU3) tooth 32-10. The WU phase winding 28 is then wound counterclockwise (CCW) around the ninth (WU4) tooth 32-9 as viewed from a leading end side of the tooth 32-9, and a winding-finish terminal portion 50-6 is placed in the ninth slot 48-9 between the eighth (UV1) tooth 32-8 and the ninth (WU4) tooth 32-9. The WU phase winding 28 is thus wound in the above manner.

Figure 25:
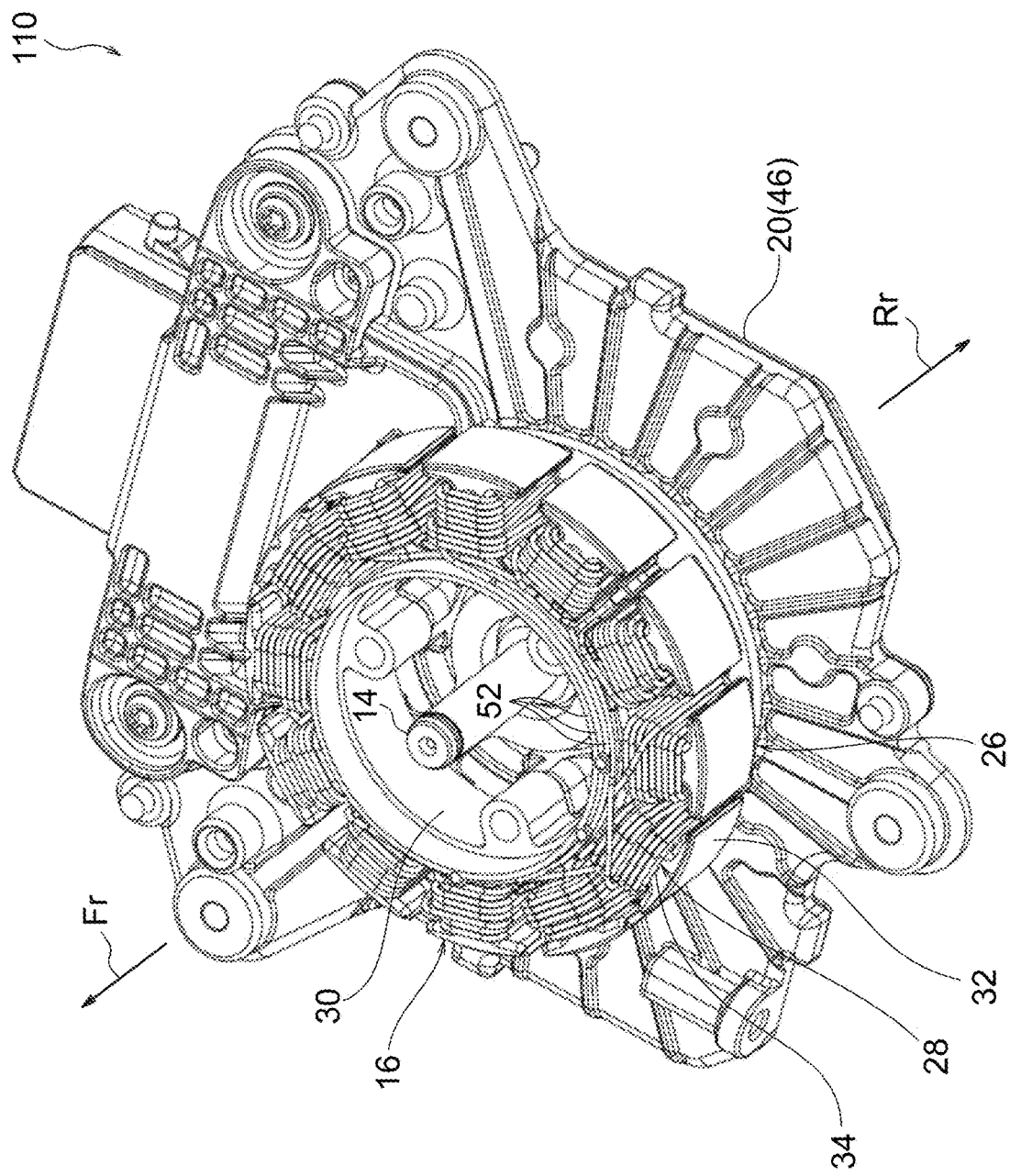
FIG. 25 is a perspective view illustrating a brushless motor according to a comparative example in a state in which a rotor has been removed.
Figure 26:
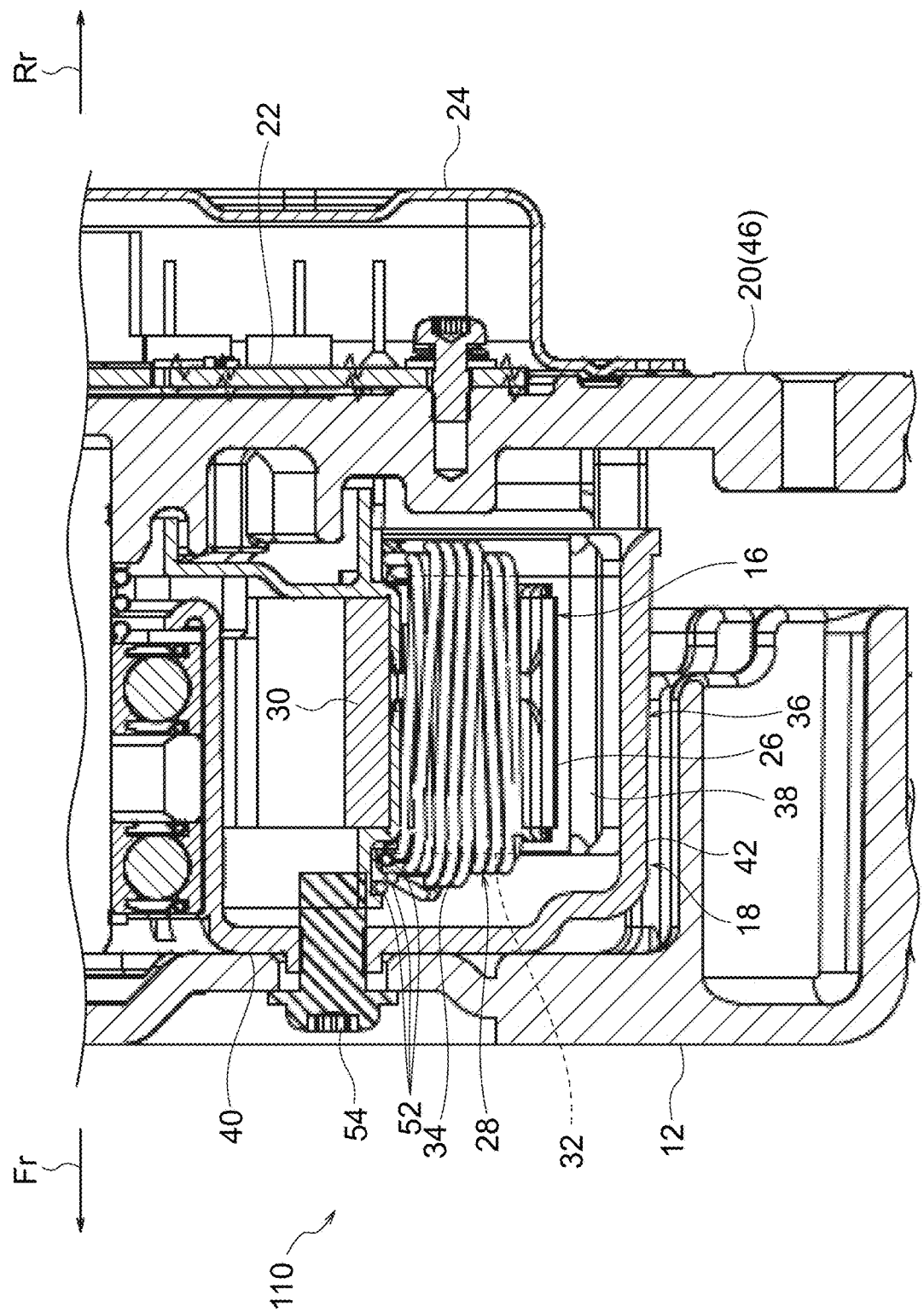
FIG. 26 is a vertical cross-section illustrating a brushless motor according to a comparative example.

The first example of a winding method for the windings 28 exhibits operation and advantageous effects as described below. Explanation will first be given regarding a comparative example in order to clarify the operation and advantageous effects of the first example of a winding method for the windings 28. FIG. 25 and FIG. 26 illustrate a brushless motor 110 in which windings 28 are wound according to a comparative example of a winding method for the windings 28. In the brushless motor 110 according to the comparative example, the same reference numerals are allocated to components with the same names as those in the brushless motor 10 according to the present exemplary embodiment.

The comparative example of a winding method for the windings 28 corresponds to the method disclosed in Japanese Patent No. 6291292, described previously. As illustrated in FIG. 25 and FIG. 26, in the brushless motor 110 in which the windings 28 are wound according to a comparative example of a winding method for the windings 28, some crossover wires 52 out of the plural crossover wires 52 are arranged on the one axial direction side of the annular section 30 of the stator core 26 (on the top wall 40 side of the rotor housing 36). Thus, for example, in cases in which the fan 12 is fixed to the top wall 40 of the rotor housing 36 using screws 54, the screws 54 and the crossover wires 52 might get in the way of one another.

A gap between the top wall 40 of the rotor housing 36 and this crossover wire 52 could be widened in order to suppress the screws 54 and the crossover wire 52 from getting in the way of one another. However, such a measure would increase the size of the brushless motor 110 in the axial direction.

In contrast thereto, in the brushless motor 10 in which the windings 28 are wound as described above according to the first example of a winding method for the windings 28, as illustrated in FIG. 5, the crossover wires 52 formed in the plural windings 28 are all arranged on the other axial direction side of the annular section 30 (i.e. on the opposite side to the top wall 40 of the rotor housing 36). Thus, the screws 54 and the crossover wires 52 can be prevented from getting in the way of one another, even for example in cases in which the fan 12 is fixed to the top wall 40 of the rotor housing 36 using the screws 54. There is accordingly no need to widen any gap between the top wall 40 of the rotor housing 36 and the crossover wires 52, thereby enabling an increase in the axial direction size of the brushless motor 10 to be suppressed.

Moreover, as illustrated in FIG. 14 to FIG. 18, the terminal portions 50-1 to 50-6 of the plural windings 28 are placed in the fifth slot 48-5, the sixth slot 48-6, the eighth slot 48-8, and the ninth slot 48-9. As illustrated in FIG. 2, this enables the plural terminal portions 50-1 to 50-6 to be consolidated on one side (the arrow A side) of a central axis C of the brushless motor 10 in a direction orthogonal to the axial direction of the brushless motor 10. Thus, in for example cases in which the plural terminal portions 50-1 to 50-6 are directly connected to the circuit board 22, the layout of components on the circuit board 22 that are connected to the terminal portions 50-1 to 50-6 can be simplified, thereby enabling any increase in cost to be suppressed.

Figure 17:
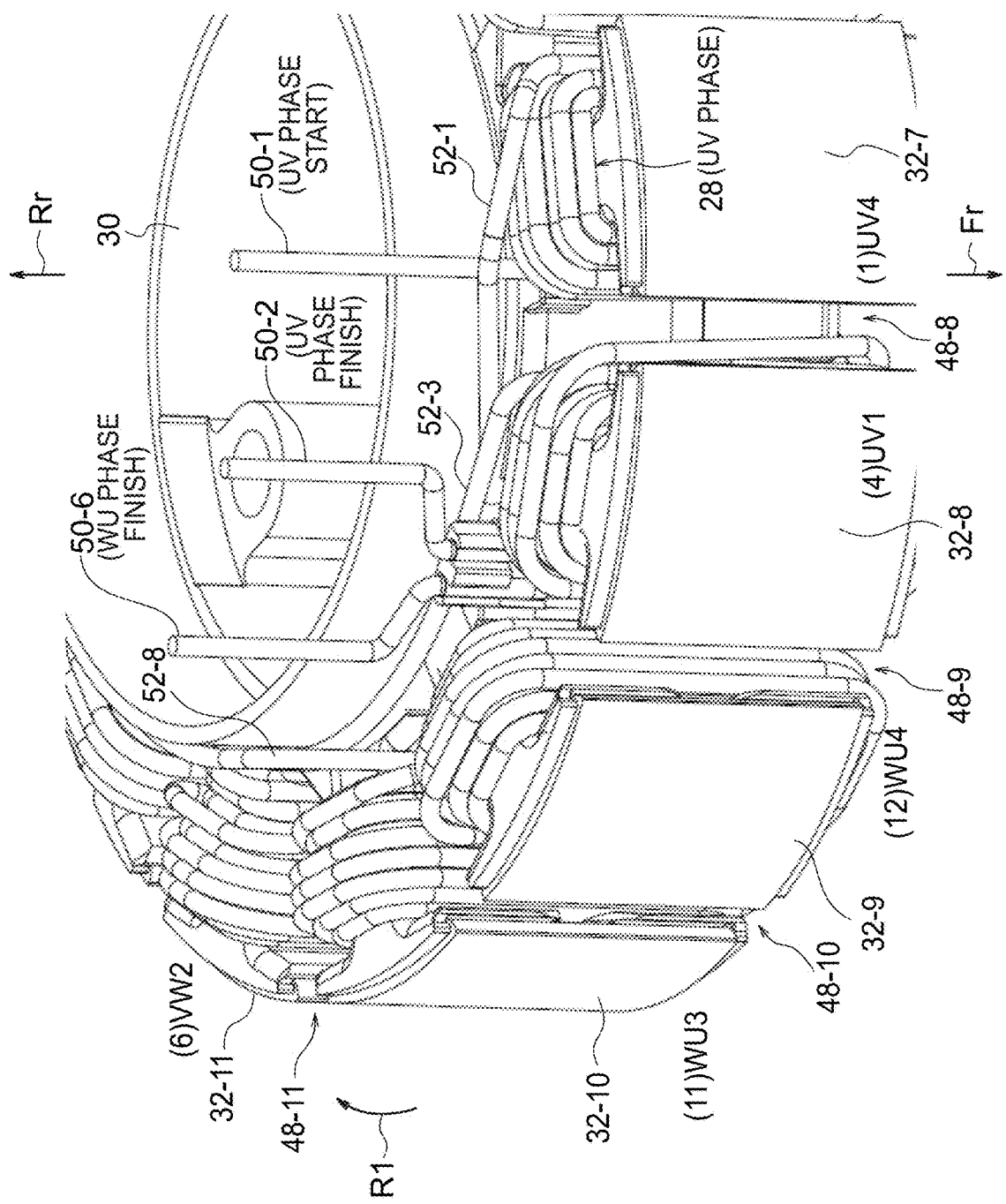
FIG. 17 is an enlarged perspective view of relevant portions, illustrating a state in which UV phase, VW phase, and WU phase windings have been wound onto a stator core.

Moreover, in the first example of a winding method for the windings 28, as illustrated in FIG. 17, the UV phase winding-finish terminal portion 50-2 and the WU phase winding-finish terminal portion 50-6 can be arranged after the UV phase crossover wires 52-1 and 52-3 have been routed, thereby enabling the UV phase and the WU phase windings 28 to be wound without the UV phase crossover wires 52-1 and 52-3 and the UV phase winding-finish terminal portion 50-2 and the WU phase winding-finish terminal portion 50-6 getting in the way of one another.

Figure 18:
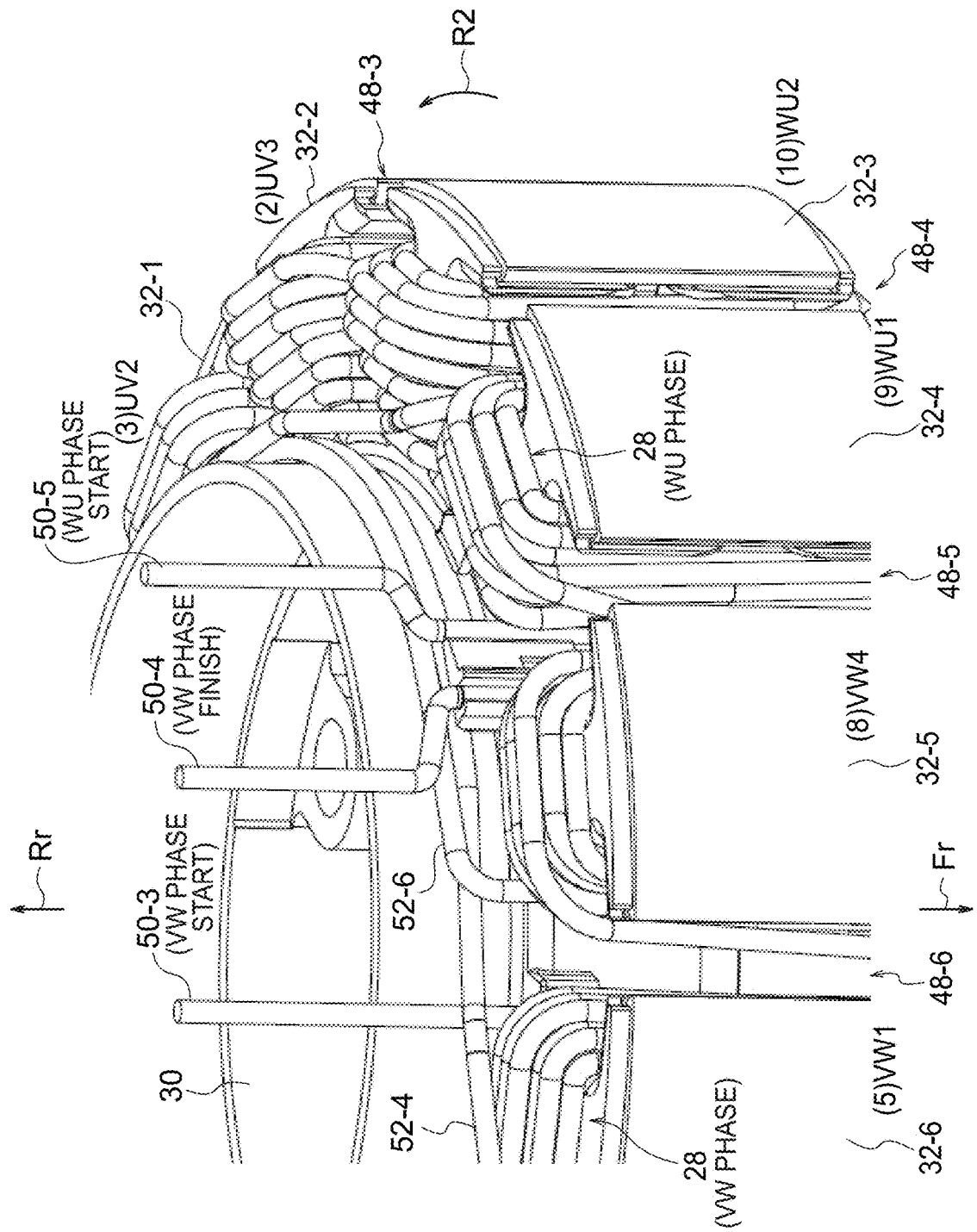
FIG. 18 is another enlarged perspective view of relevant portions, illustrating a state in which UV phase, VW phase, and WU phase windings have been wound onto a stator core.

Moreover, as illustrated in FIG. 18, the VW phase winding-finish terminal portion 50-4 and the WU phase winding-start terminal portion 50-5 can be arranged after the VW phase crossover wires 52-4 and 52-6 have been routed, thereby enabling the VW phase and the WU phase windings 28 to be wound without the VW phase crossover wires 52-4 and 52-6 and the VW phase winding-finish terminal portion 50-4 and the WU phase winding-start terminal portion 50-5 getting in the way of one another. This enables unwinding of the coils 34 to prevented, enables a reduction in space, and also renders subsequent adjustments unnecessary, thereby enabling a reduction in cost.

Next, explanation follows regarding the second example of a winding method for the windings 28.

Figure 20A:
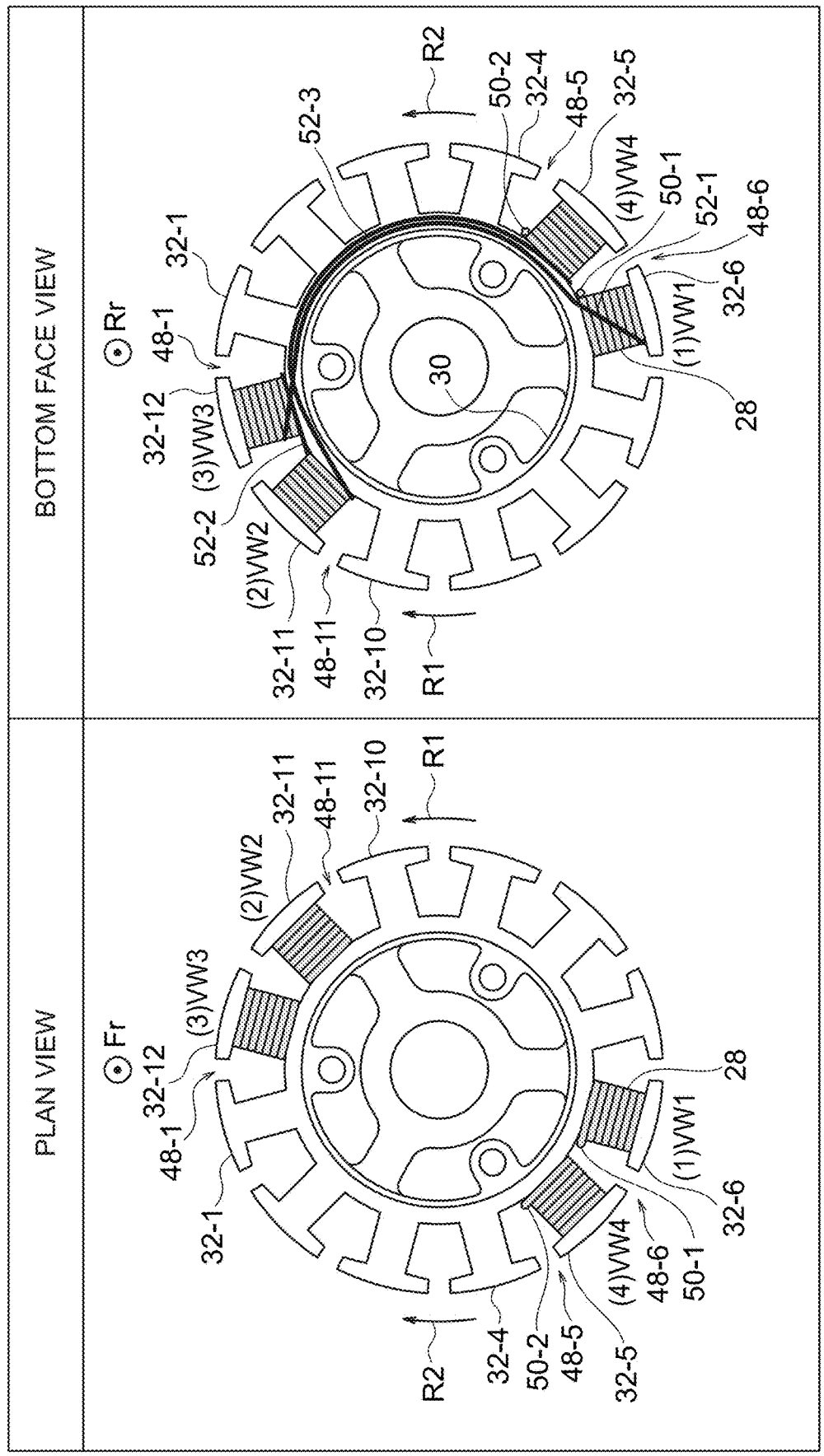
FIG. 20A is an explanatory diagram illustrating a winding process of a UV phase winding in the second example of a winding method for the windings.

FIG. 19 and FIG. 20A to FIG. 20C illustrate how the plural windings 28 are wound in sequence according to the second example of a winding method for the windings 28. FIG. 20A to FIG. 20C each include both a plan view and a bottom face view. As illustrated in FIG. 19 and FIG. 20A to FIG. 20C, in the second example of a winding method for the windings 28, the plural windings 28 are wound in sequence starting from the VW phase winding 28, followed by the UV phase winding 28, and finally the WU phase winding 28. The respective winding sequences of the VW phase, UV phase, and WU phase windings 28 are the same as in the first example.

FIG. 19 and FIG. 20A to FIG. 20C include the numbers (1) to (12) to indicate the sequence in which the windings 28 are wound around the plural teeth 32. Moreover, in FIG. 19 and FIG. 20A to FIG. 20C, the terminal portions 50-1 to 50-6 of the windings 28 are allocated the numbers 1 to 6 in the sequence in which they are arranged. Similarly, the crossover wires 52-1 to 52-9 are allocated the numbers 1 to 9 in the sequence in which they are routed.

As illustrated in FIG. 5, according to the second example of a winding method for the windings 28, the crossover wires 52 formed in the plural windings 28 are all arranged on the other axial direction side of the annular section 30 (i.e. on the opposite side to the top wall 40 of the rotor housing 36). Thus, the screws 54 and the crossover wires 52 can be prevented from getting in the way of one another, even for example in cases in which the fan 12 is fixed to the top wall 40 of the rotor housing 36 using the screws 54. There is accordingly no need to widen any gap between the top wall 40 of the rotor housing 36 and the crossover wires 52, thereby enabling an increase in the axial direction size of the brushless motor 10 to be suppressed.

Moreover, the terminal portions 50-1 to 50-6 of the plural windings 28 are placed in the fifth slot 48-5, the sixth slot 48-6, the eighth slot 48-8, and the ninth slot 48-9. Thus, similarly to in the first example of a winding method for the windings 28, this enables the plural terminal portions 50-1 to 50-6 to be consolidated on one side (the arrow A side) of the central axis C of the brushless motor 10 in a direction orthogonal to the axial direction of the brushless motor 10 (see FIG. 2). Thus, in for example cases in which the plural terminal portions 50-1 to 50-6 are directly connected to the circuit board 22, the layout of components on the circuit board 22 that are connected to the terminal portions 50-1 to 50-6 can be simplified, thereby enabling any increase in cost to be suppressed.

Next, explanation follows regarding the third example of a winding method for the windings 28.

Figure 22A:
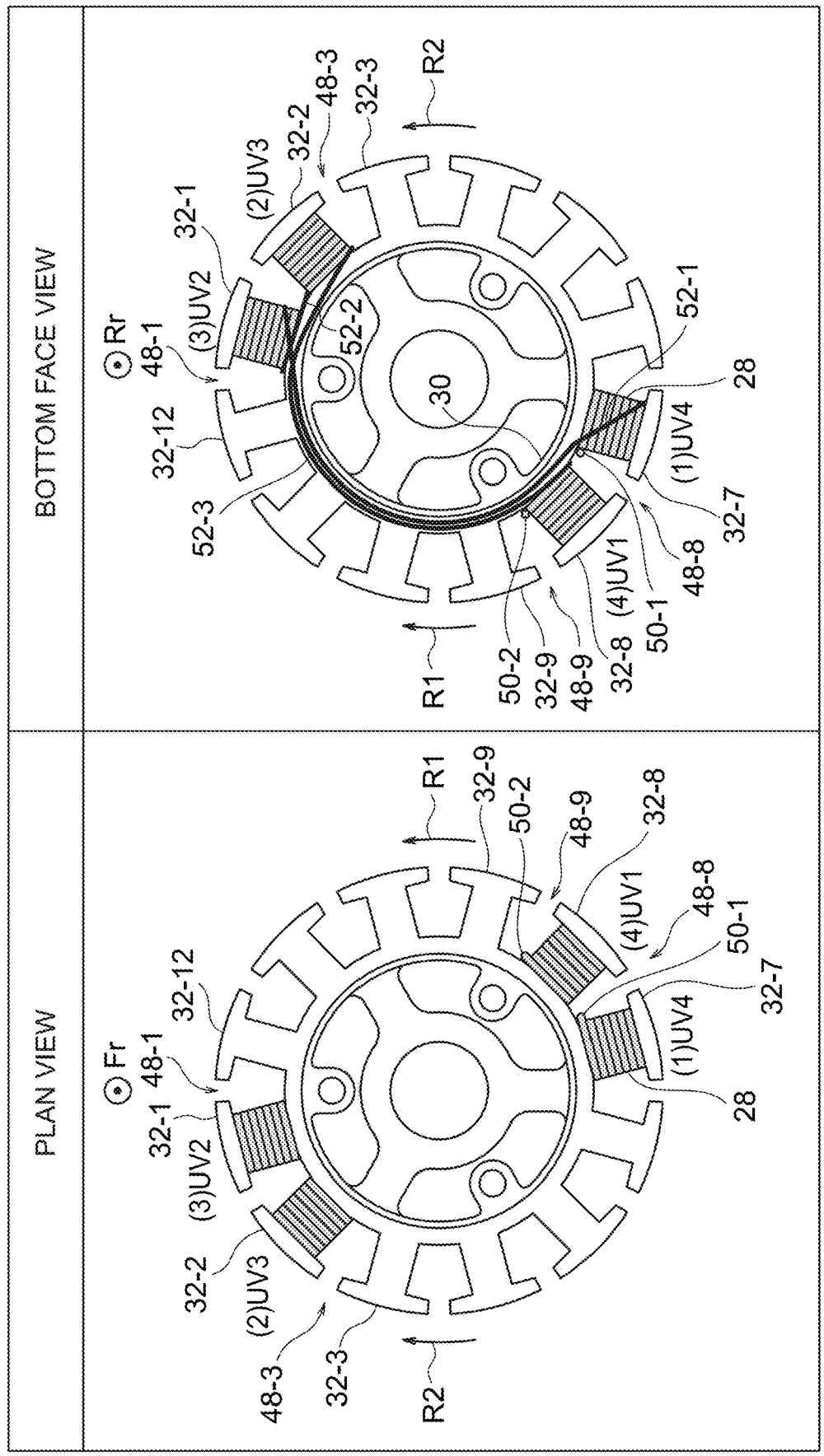
FIG. 22A is an explanatory diagram illustrating a winding process of a UV phase winding in the third example of a winding method for the windings.
Figure 22B:
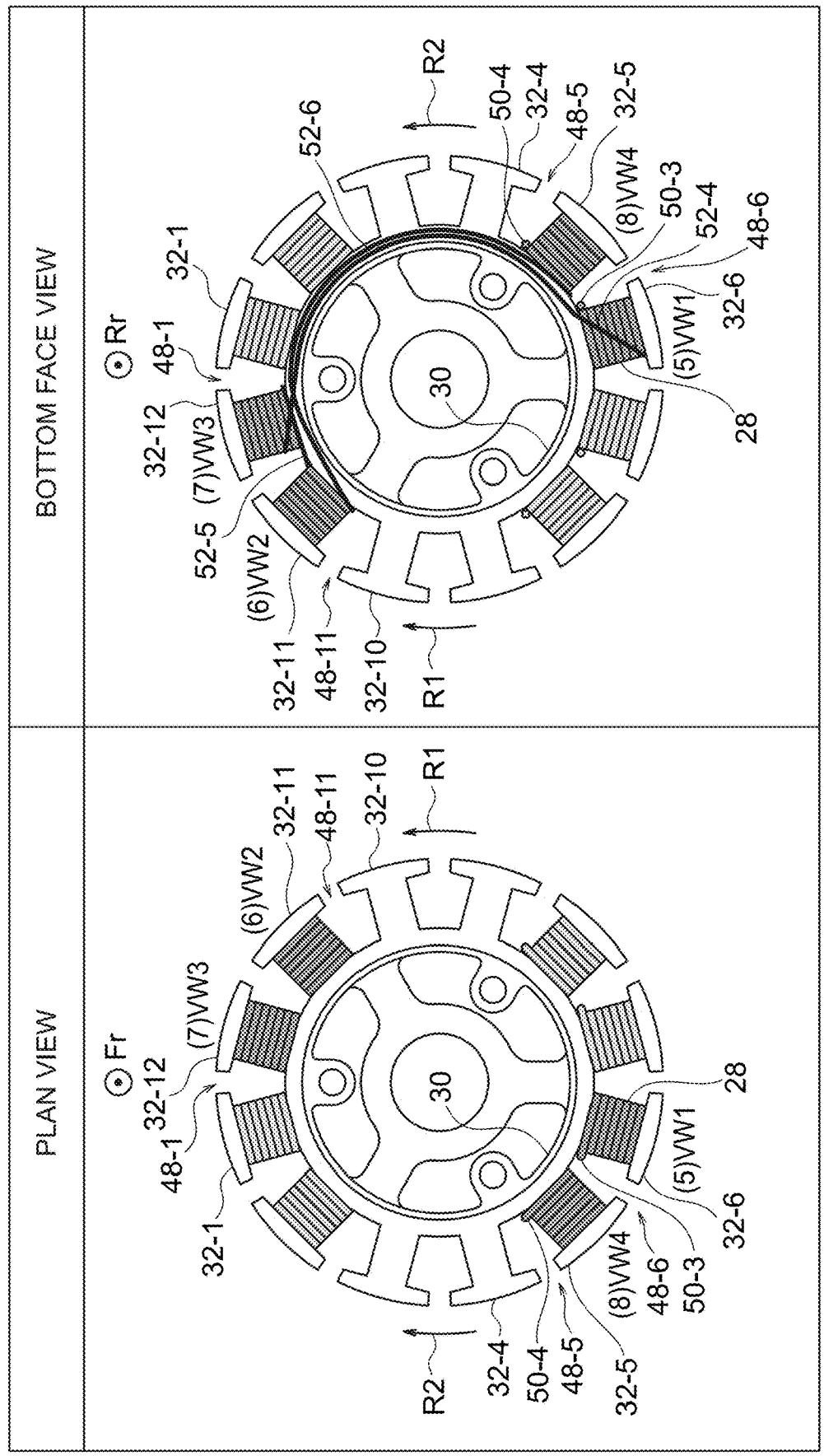
FIG. 22B is an explanatory diagram illustrating a winding process of a VW phase winding in the third example of a winding method for the windings.
Figure 22C:
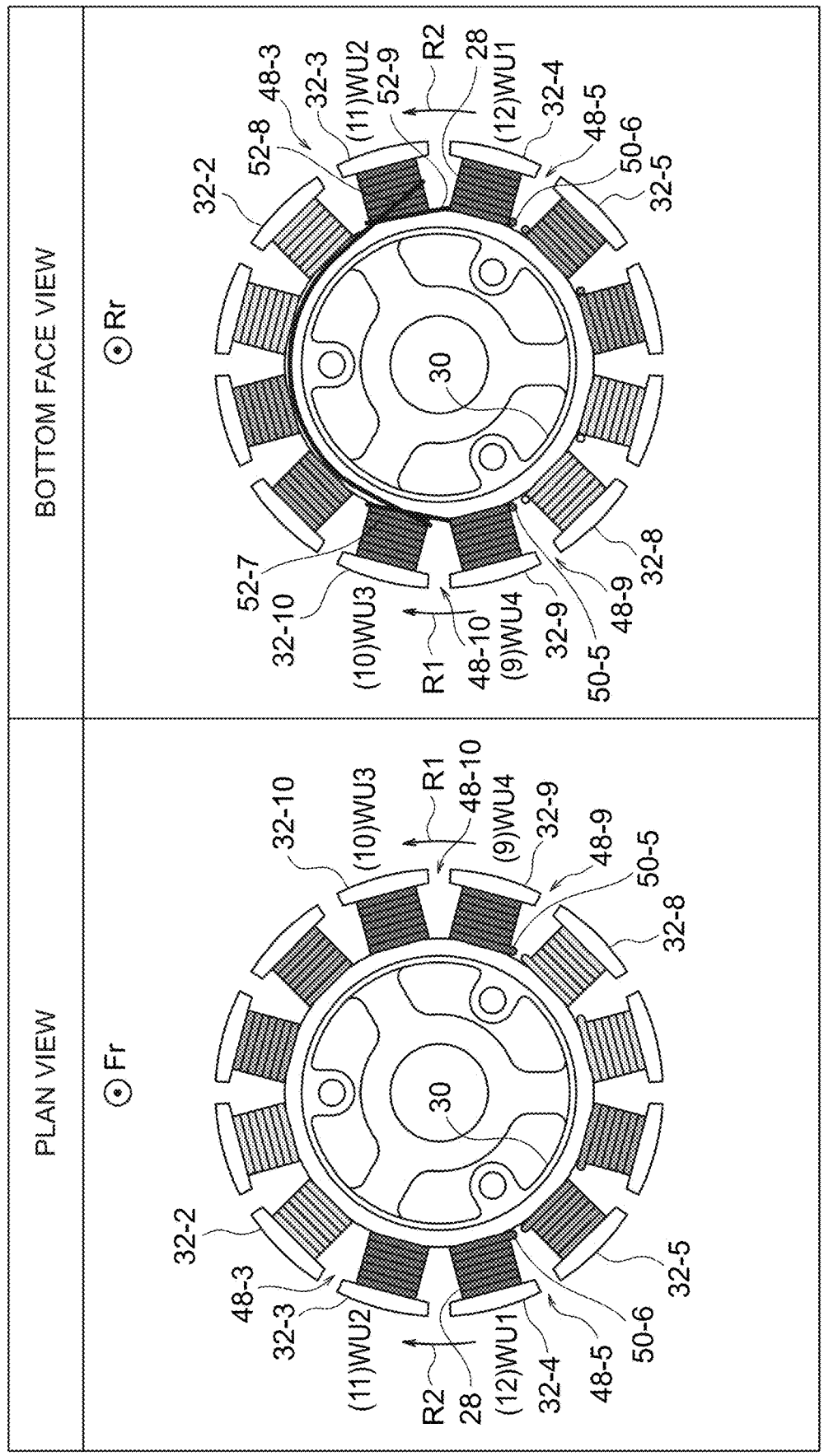
FIG. 22C is an explanatory diagram illustrating a winding process of a WU phase winding in the third example of a winding method for the windings.

FIG. 21 and FIG. 22A to FIG. 22C illustrate how the plural windings 28 are wound in sequence according to the third example of a winding method for the windings 28. FIG. 22A to FIG. 22C each include both a plan view and a bottom face view. As illustrated in FIG. 21 and FIG. 22A to FIG. 22C, in the third example of a winding method for the windings 28, the plural windings 28 are wound in sequence starting from the UV phase winding 28, followed by the VW phase winding 28, and finally the WU phase winding 28. Note that the respective winding sequences of the VW phase and the UV phase windings 28 are the same as in the first example, whereas the winding sequence of the WU phase winding 28 is the reverse of that in the first example.

FIG. 21 and FIG. 22A to FIG. 22C include the numbers (1) to (12) to indicate the sequence in which the windings 28 are wound around the plural teeth 32. Moreover, in FIG. 21 and FIG. 22A to FIG. 22C, the terminal portions 50-1 to 50-6 of the windings 28 are allocated the numbers 1 to 6 in the sequence in which they are arranged. Similarly, the crossover wires 52-1 to 52-9 are allocated the numbers 1 to 9 in the sequence in which they are routed.

In the third example of a winding method for the windings 28, the winding-start terminal portion 50-5 of the WU phase winding 28 is placed in the ninth slot 48-9 between the ninth (WU4) tooth 32-9 and the eighth (UV1) tooth 32-8. The WU phase winding 28 is then wound clockwise (CW) around the ninth (WU4) tooth 32-9 as viewed from the leading end side of the tooth 32-9, and the crossover wire 52-7 is then routed toward the one circumferential direction side (R1 side) of the annular section 30 on the other axial direction side (Rr side) of the annular section 30.

Next, the WU phase winding 28 is inserted into the eleventh slot 48-11 between the tenth (WU3) tooth 32-10 and the eleventh (VW2) tooth 32-11. The WU phase winding 28 is then wound counterclockwise (CCW) around the tenth (WU3) tooth 32-10 as viewed from the leading end side of the tooth 32-10, and the crossover wire 52-8 is then routed toward the one circumferential direction side (R1 side) of the annular section 30 on the other axial direction side (Rr side) of the annular section 30.

Next, the WU phase winding 28 is inserted into the fourth slot 48-4 between the third (WU2) tooth 32-3 and the fourth (WU1) tooth 32-4. The WU phase winding 28 is then wound counterclockwise (CCW) around the third (WU2) tooth 32-3 as viewed from the leading end side of the tooth 32-3, and the crossover wire 52-9 is then routed toward the one circumferential direction side (R1 side) of the annular section 30 on the other axial direction side (Rr side) of the annular section 30.

Next, the WU phase winding 28 is inserted into the fourth slot 48-4 between the third (WU2) tooth 32-3 and the fourth (WU1) tooth 32-4. The WU phase winding 28 is then wound clockwise (CW) around the fourth (WU1) tooth 32-4 as viewed from the leading end side of the tooth 32-4, and the winding-finish terminal portion 50-6 is placed in the fifth slot 48-5 between the fourth (WU1) tooth 32-4 and the fifth (VW4) tooth 32-5. The WU phase winding 28 is thus wound in the above manner.

As illustrated in FIG. 5, in the third example of a winding method for the windings 28, the crossover wires 52 formed in the plural windings 28 are all arranged on the other axial direction side of the annular section 30 (i.e. on the opposite side to the top wall 40 of the rotor housing 36). Thus, the screws 54 and the crossover wires 52 can be prevented from getting in the way of one another, even for example in cases in which the fan 12 is fixed to the top wall 40 of the rotor housing 36 using the screws 54. There is accordingly no need to widen a gap between the top wall 40 of the rotor housing 36 and the crossover wires 52, thereby enabling an increase in the axial direction size of the brushless motor 10 to be suppressed.

Moreover, the terminal portions 50-1 to 50-6 of the plural windings 28 are placed in the fifth slot 48-5, the sixth slot 48-6, the eighth slot 48-8, and the ninth slot 48-9. Thus, similarly to in the first example of a winding method for the windings 28, this enables the plural terminal portions 50-1 to 50-6 to be consolidated on one side (the arrow A side) of the central axis C of the brushless motor 10 in a direction orthogonal to the axial direction of the brushless motor 10 (see FIG. 2). Thus, in for example cases in which the plural terminal portions 50-1 to 50-6 are directly connected to the circuit board 22, the layout of components on the circuit board 22 that are connected to the terminal portions 50-1 to 50-6 can be simplified, thereby enabling any increase in cost to be suppressed.

Next, explanation follows regarding the fourth example of a winding method for the windings 28.

Figure 24A:
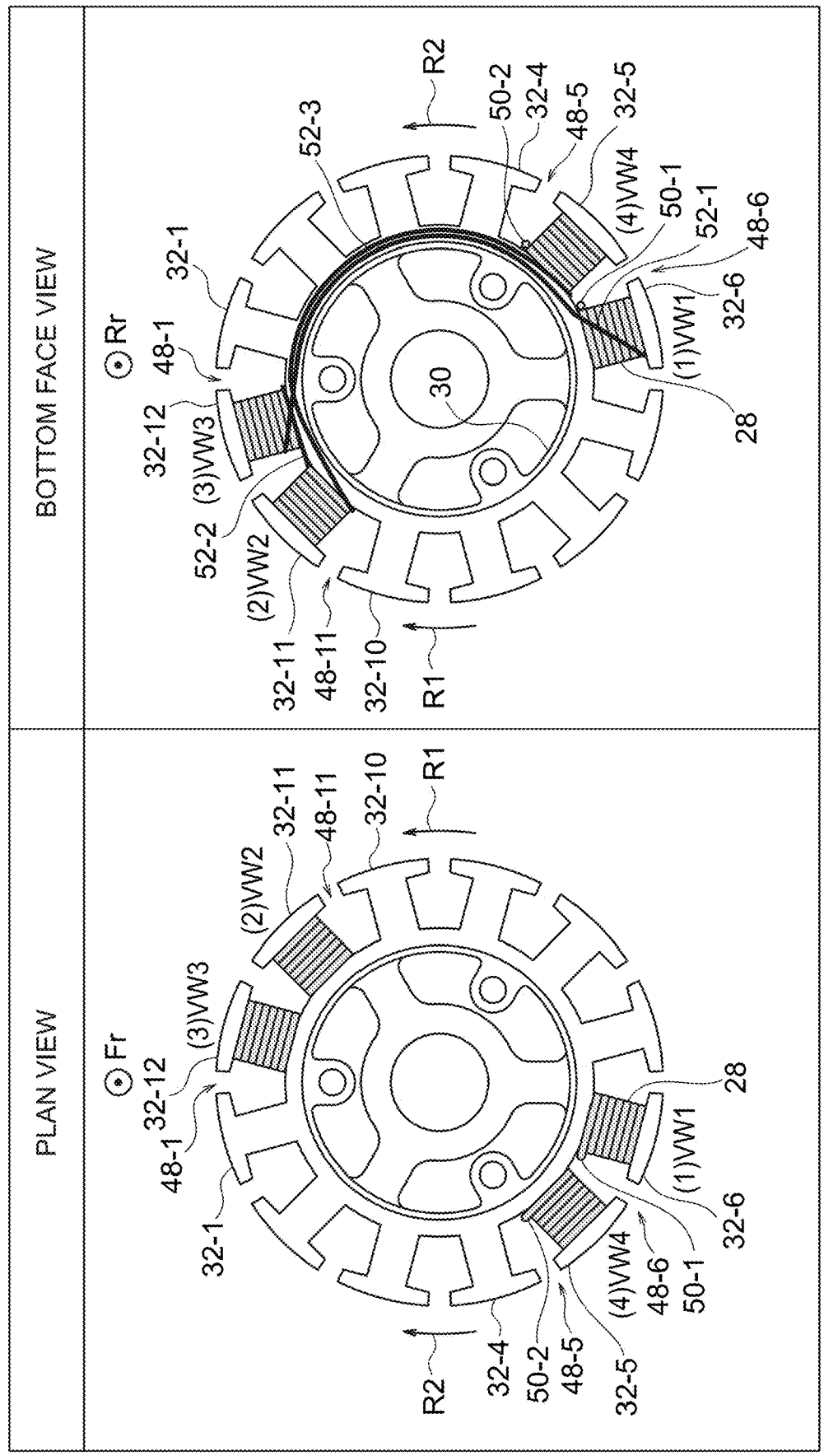
FIG. 24A is an explanatory diagram illustrating a winding process of a UV phase winding in the fourth example of a winding method for the windings.
Figure 24B:
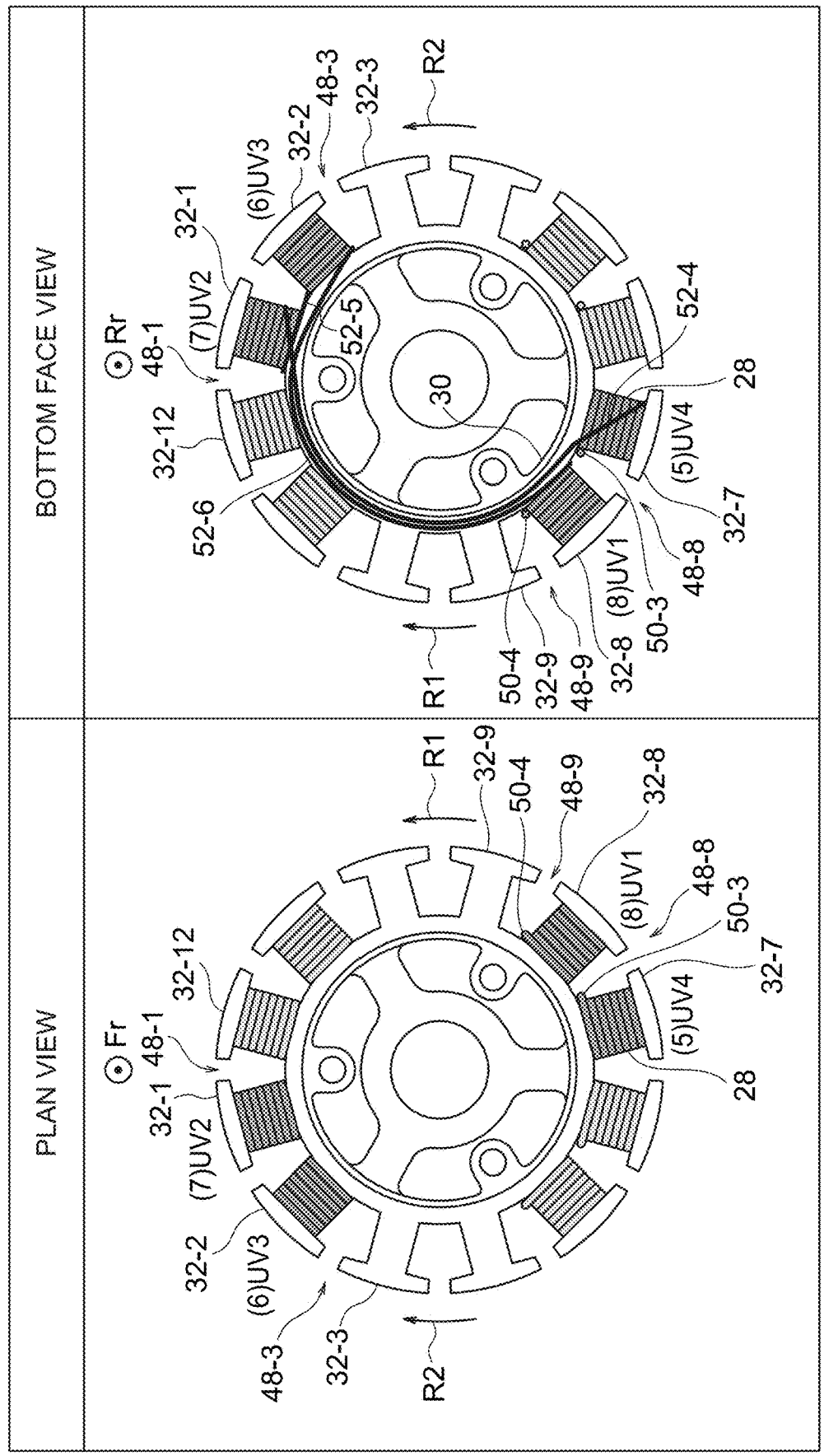
FIG. 24B is an explanatory diagram illustrating a winding process of a VW phase winding in the fourth example of a winding method for the windings.
Figure 24C:
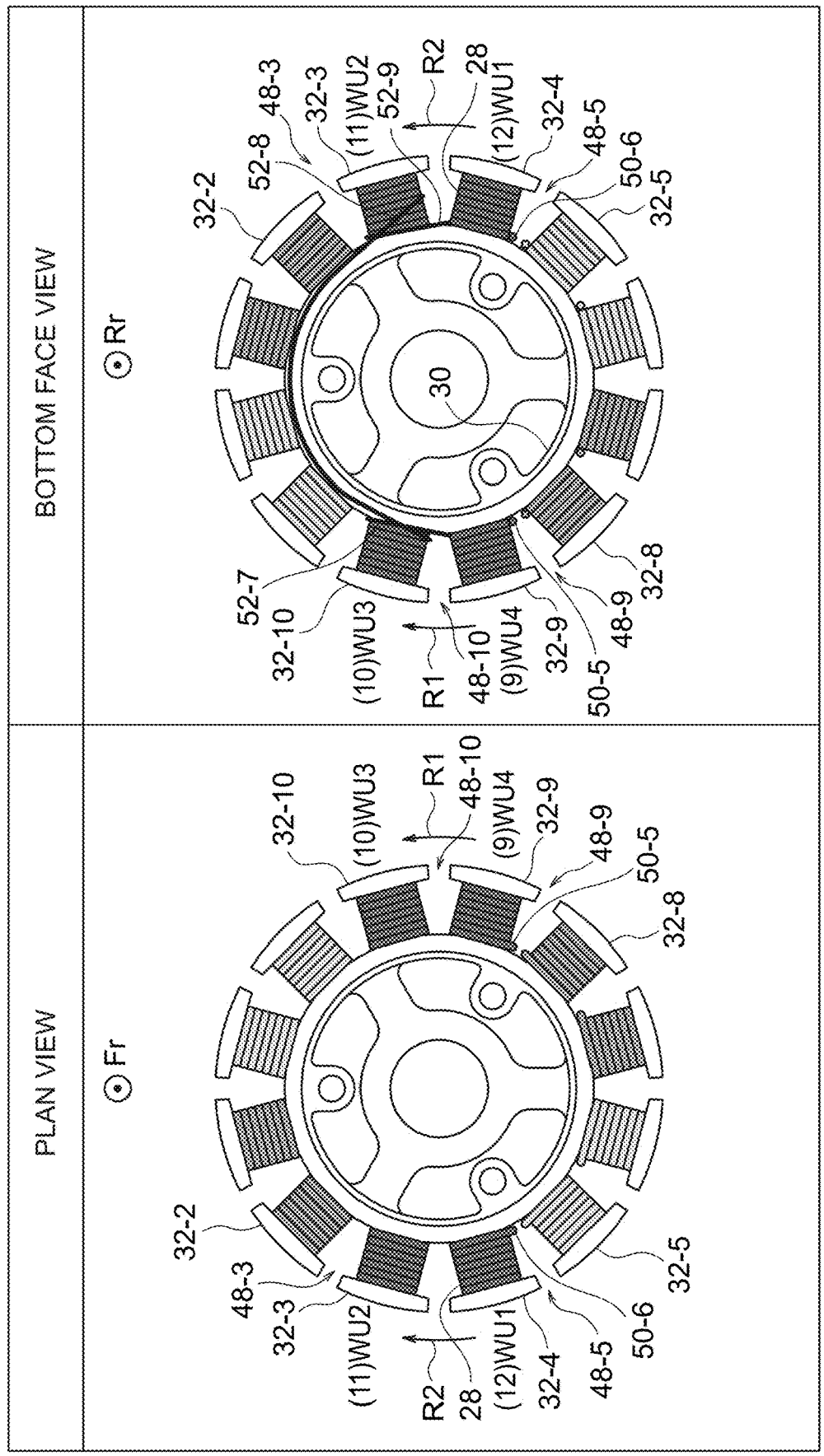
FIG. 24C is an explanatory diagram illustrating a winding process of a WU phase winding in the fourth example of a winding method for the windings.

FIG. 23 and FIG. 24A to FIG. 24C illustrate how the plural windings 28 are wound in sequence according to the fourth example of a winding method for the windings 28. FIG. 24A to FIG. 24C each include both a plan view and a bottom face view. As illustrated in FIG. 23 and FIG. 24A to FIG. 24C, in the fourth example of a winding method for the windings 28, the plural windings 28 are wound in sequence starting from the VW phase winding 28, followed by the UV phase winding 28, and finally the WU phase winding 28. Note that the respective winding sequences of the VW phase and the UV phase windings 28 are the same as in the first example, whereas the winding sequence of the WU phase winding 28 is the same as in the third example.

FIG. 23 and FIG. 24A to FIG. 24C include the numbers (1) to (12) to indicate the sequence in which the windings 28 are wound around the plural teeth 32. Moreover, in FIG. 23 and FIG. 24A to FIG. 24C, the terminal portions 50-1 to 50-6 of the windings 28 are allocated the numbers 1 to 6 in the sequence in which they are arranged. Similarly, the crossover wires 52-1 to 52-9 are allocated the numbers 1 to 9 in the sequence in which they are routed.

As illustrated in FIG. 5, in this fourth example of a winding method for the windings 28, the crossover wires 52 formed in the plural windings 28 are all arranged on the other axial direction side of the annular section 30 (i.e. on the opposite side to the top wall 40 of the rotor housing 36). Thus, the screws 54 and the crossover wires 52 can be prevented from getting in the way of one another, even for example in cases in which the fan 12 is fixed to the top wall 40 of the rotor housing 36 using the screws 54. There is accordingly no need to widen a gap between the top wall 40 of the rotor housing 36 and the crossover wires 52, thereby enabling an increase in the axial direction size of the brushless motor 10 to be suppressed.

Moreover, the terminal portions 50-1 to 50-6 of the plural windings 28 are placed in the fifth slot 48-5, the sixth slot 48-6, the eighth slot 48-8, and the ninth slot 48-9. Thus, similarly to in the first example of a winding method for the windings 28, this enables the plural terminal portions 50-1 to 50-6 to be consolidated on one side (the arrow A side) of the central axis C of the brushless motor 10 in a direction orthogonal to the axial direction of the brushless motor 10 (see FIG. 2). Thus, in for example cases in which the plural terminal portions 50-1 to 50-6 are directly connected to the circuit board 22, the layout of components on the circuit board 22 that are connected to the terminal portions 50-1 to 50-6 can be simplified, thereby enabling any increase in cost to be suppressed.

Although an exemplary embodiment of the present disclosure has been described above, the present disclosure is not limited to the above description, and obviously various other modifications may be implemented within a range not departing from the spirit of the present disclosure.

The entire content of the disclosure of Japanese Patent Application No. 2019-167233 is incorporated by reference in the present specification.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A brushless motor comprising:
   a stator that includes a stator core having an annular section and a plurality of teeth formed in a radial pattern around an outer side of the annular section, the stator also including a plurality of windings wound around the plurality of teeth;
   a rotor that includes a rotor housing having a top wall disposed on one axial direction side of the stator and a peripheral wall surrounding the stator, the rotor also including a plurality of magnets fixed to the peripheral wall; and
   a circuit board that is disposed on another axial direction side of the stator and that is electrically connected to terminal portions of the plurality of windings, the terminal portions extending to the other axial direction side of the stator, wherein:
   the brushless motor is an outrunner type of brushless motor configured such that a number of magnetic poles of the plurality of magnets and a number of slots between the plurality of teeth respectively equal either ten poles and twelve slots or fourteen poles and twelve slots;
   the plurality of windings are configured by delta-connected three-phase windings; and
   when the plurality of teeth are sequentially denoted as a first tooth to a twelfth tooth on progression toward one circumferential direction side of the stator,
   in a first phase winding,
      a winding-start terminal portion of the first phase winding is placed in an eighth slot between a seventh tooth and an eighth tooth, the first phase winding is wound in a counterclockwise direction around the seventh tooth as viewed from a leading end side of the seventh tooth, and a crossover wire is then routed toward the one circumferential direction side of the annular section on the other axial direction side of the annular section,
      the first phase winding is then inserted into a third slot between a second tooth and a third tooth and wound in a counterclockwise direction around the second tooth as viewed from a leading end side of the second tooth, and a crossover wire is then routed toward another circumferential direction side of the annular section on the other axial direction side of the annular section,
      the first phase winding is then inserted into a first slot between the first tooth and the twelfth tooth and wound in a clockwise direction around the first tooth as viewed from a leading end side of the first tooth, and a crossover wire is then routed toward the other circumferential direction side of the annular section on the other axial direction side of the annular section, and
      the first phase winding is then inserted into the eighth slot between the seventh tooth and the eighth tooth and wound in a clockwise direction around the eighth tooth as viewed from a leading end side of the eighth tooth, and a winding-finish terminal portion of the first phase winding is then placed in a ninth slot between the eighth tooth and a ninth tooth,
   in a second phase winding,
      a winding-start terminal portion of the second phase winding is placed in a sixth slot between a fifth tooth and a sixth tooth, the second phase winding is wound in a clockwise direction around the sixth tooth as viewed from a leading end side of the sixth tooth, and a crossover wire is then routed toward the other circumferential direction side of the annular section on the other axial direction side of the annular section,
      the second phase winding is then inserted into an eleventh slot between a tenth tooth and an eleventh tooth and wound in a clockwise direction around the eleventh tooth as viewed from a leading end side of the eleventh tooth, and a crossover wire is then routed toward the one circumferential direction side of the annular section on the other axial direction side of the annular section,
      the second phase winding is then inserted into the first slot between the twelfth tooth and the first tooth and wound in a counterclockwise direction around the twelfth tooth as viewed from a leading end side of the twelfth tooth, and a crossover wire is then routed toward the one circumferential direction side of the annular section on the other axial direction side of the annular section, and
      the second phase winding is then inserted into the sixth slot between the fifth tooth and the sixth tooth and wound in a counterclockwise direction around the fifth tooth as viewed from a leading end side of the fifth tooth, and a winding-finish terminal portion of the second phase winding is then placed in a fifth slot between a fourth tooth and the fifth tooth, and
   in a third phase winding,
      a winding-start terminal portion of the third phase winding is placed in the fifth slot between the fourth tooth and the fifth tooth, the third phase winding is wound in a counterclockwise direction around the fourth tooth as viewed from a leading end side of the fourth tooth, and a crossover wire is then routed toward the other circumferential direction side of the annular section on the other axial direction side of the annular section,
      the third phase winding is then inserted into the third slot between the second tooth and the third tooth and wound in a clockwise direction around the third tooth as viewed from a leading end side of the third tooth, and a crossover wire is then routed toward the other circumferential direction side of the annular section on the other axial direction side of the annular section,
      the third phase winding is then inserted into a tenth slot between the ninth tooth and the tenth tooth and wound in a clockwise direction around the tenth tooth as viewed from a leading end side of the tenth tooth, and a crossover wire is then routed toward the other circumferential direction side of the annular section on the other axial direction side of the annular section, and the third phase winding is then inserted into the tenth slot between the ninth tooth and the tenth tooth and wound in a counterclockwise direction around the ninth tooth as viewed from a leading end side of the ninth tooth, and a winding-finish terminal portion of the third phase winding is then placed in the ninth slot between the eighth tooth and the ninth tooth.

2. A brushless motor comprising:

a stator that includes a stator core having an annular section and a plurality of teeth formed in a radial pattern around an outer side of the annular section, the stator also including a plurality of windings wound around the plurality of teeth;

a rotor that includes a rotor housing having a top wall disposed on one axial direction side of the stator and a peripheral wall surrounding the stator, the rotor also including a plurality of magnets fixed to the peripheral wall; and a circuit board that is disposed on another axial direction side of the stator and that is electrically connected to terminal portions of the plurality of windings, the terminal portions extending to the other axial direction side of the stator, wherein:

the brushless motor is an outrunner type of brushless motor configured such that a number of magnetic poles of the plurality of magnets and a number of slots between the plurality of teeth respectively equal either ten poles and twelve slots or fourteen poles and twelve slots;

the plurality of windings are configured by delta-connected three-phase windings; and when the plurality of teeth are sequentially denoted as a first tooth to a twelfth tooth on progression toward one circumferential direction side of the stator, in a first phase winding, a winding-start terminal portion of the first phase winding is placed in an eighth slot between a seventh tooth and an eighth tooth, the first phase winding is wound in a counterclockwise direction around the seventh tooth as viewed from a leading end side of the seventh tooth, and a crossover wire is then routed toward the one circumferential direction side of the annular section on the other axial direction side of the annular section, the first phase winding is then inserted into a third slot between a second tooth and a third tooth and wound in a counterclockwise direction around the second tooth as viewed from a leading end side of the second tooth, and a crossover wire is then routed toward another circumferential direction side of the annular section on the other axial direction side of the annular section, the first phase winding is then inserted into a first slot between the first tooth and the twelfth tooth and wound in a clockwise direction around the first tooth as viewed from a leading end side of the first tooth, and a crossover wire is then routed toward the other circumferential direction side of the annular section on the other axial direction side of the annular section, and the first phase winding is then inserted into the eighth slot between the seventh tooth and the eighth tooth and wound in a clockwise direction around the eighth tooth as viewed from a leading end side of the eighth tooth, and a winding-finish terminal portion of the first phase winding is then placed in a ninth slot between the eighth tooth and a ninth tooth, in a second phase winding, a winding-start terminal portion of the second phase winding is placed in a sixth slot between a fifth tooth and a sixth tooth, the second phase winding is wound in a clockwise direction around the sixth tooth as viewed from a leading end side of the sixth tooth, and a crossover wire is then routed toward the other circumferential direction side of the annular section on the other axial direction side of the annular section, the second phase winding is then inserted into an eleventh slot between a tenth tooth and an eleventh tooth and wound in a clockwise direction around the eleventh tooth as viewed from a leading end side of the eleventh tooth, and a crossover wire is then routed toward the one circumferential direction side of the annular section on the other axial direction side of the annular section, the second phase winding is then inserted into the first slot between the twelfth tooth and the first tooth and wound in a counterclockwise direction around the twelfth tooth as viewed from a leading end side of the twelfth tooth, and a crossover wire is then routed toward the one circumferential direction side of the annular section on the other axial direction side of the annular section, and the second phase winding is then inserted into the sixth slot between the fifth tooth and the sixth tooth and wound in a counterclockwise direction around the fifth tooth as viewed from a leading end side of the fifth tooth, and a winding-finish terminal portion of the second phase winding is then placed in a fifth slot between a fourth tooth and the fifth tooth, and in a third phase winding, a winding-start terminal portion of the third phase winding is placed in the ninth slot between the ninth tooth and the eighth tooth, the third phase winding is wound in a clockwise direction around the ninth tooth as viewed from a leading end side of the ninth tooth, and a crossover wire is then routed toward the one circumferential direction side of the annular section on the other axial direction side of the annular section, the third phase winding is then inserted into the eleventh slot between the tenth tooth and the eleventh tooth and wound in a counterclockwise direction around the tenth tooth as viewed from a leading end side of the tenth tooth, and a crossover wire is then routed toward the one circumferential direction side of the annular section on the other axial direction side of the annular section, the third phase winding is then inserted into a fourth slot between the third tooth and the fourth tooth and wound in a counterclockwise direction around the third tooth as viewed from a leading end side of the third tooth, and a crossover wire is then routed toward the one circumferential direction side of the annular section on the other axial direction side of the annular section, and the third phase winding is then inserted into the fourth slot between the third tooth and the fourth tooth and wound in a clockwise direction around the fourth tooth as viewed from a leading end side of the fourth tooth, and a winding-finish terminal portion of the third phase winding is then placed in the fifth slot between the fourth tooth and the fifth tooth.

\* \* \* \* \*